United States Patent
Sánchez Domínguez et al.

(10) Patent No.: US 8,833,111 B2
(45) Date of Patent: Sep. 16, 2014

(54) FLOATING CLUTCH FOR DUAL CONCENTRIC SHAFTS ARRANGEMENT

(75) Inventors: José Higinio Sánchez Domínguez, Querétaro (MX); Edgar Rene Aranda Sánchez, Querétaro (MX)

(73) Assignee: Mabe Mexico S. de R.L. de C.V., Queretaro (MX)

(*) Notice: Subject to any disclaimer, the term of this patent is extended or adjusted under 35 U.S.C. 154(b) by 1959 days.

(21) Appl. No.: 11/600,645

(22) Filed: Nov. 16, 2006

(65) Prior Publication Data
US 2007/0130999 A1 Jun. 14, 2007

(30) Foreign Application Priority Data
Dec. 14, 2005 (MX) .................... PA/A/2005/013677

(51) Int. Cl.
*D06F 29/00* (2006.01)
*D06F 37/24* (2006.01)
*F16D 43/28* (2006.01)
*D06F 37/40* (2006.01)
*F16D 11/14* (2006.01)

(52) U.S. Cl.
CPC ............... *D06F 37/40* (2013.01); *D06F 37/24* (2013.01); *F16D 43/28* (2013.01); *F16D 11/14* (2013.01)
USPC ........................................................ 68/23.6

(58) Field of Classification Search
USPC ...................... 68/12.24, 23.6, 23.7
See application file for complete search history.

(56) References Cited

U.S. PATENT DOCUMENTS

| | | | |
|---|---|---|---|
| 2,609,697 A | 9/1952 | Ruscoe | |
| 2,665,576 A | 1/1954 | Thiele | |
| 3,557,580 A | 1/1971 | Cochran | |
| 5,473,916 A * | 12/1995 | Ye | 68/134 |
| 5,586,455 A * | 12/1996 | Imai et al. | 68/12.02 |
| 5,651,277 A | 7/1997 | Richardson | |
| 6,634,193 B2 | 10/2003 | Lee et al. | |
| 2002/0166349 A1* | 11/2002 | Lim et al. | 68/23.7 |
| 2003/0110575 A1* | 6/2003 | Lee et al. | 8/158 |

FOREIGN PATENT DOCUMENTS

| | | |
|---|---|---|
| GB | 915997 | 1/1963 |
| JP | 2002346270 A * | 12/2002 |

OTHER PUBLICATIONS

Machine Translation of Terai, JP 2002-346270, Dec. 2002.*

* cited by examiner

*Primary Examiner* — David Cormier
(74) *Attorney, Agent, or Firm* — Beusse Wolter Sanks & Maire, P.A.

(57) ABSTRACT

This invention consists of a floating clutch for two concentric shafts. This is achieved by means of a movable body transmitting energy from one shaft to the other via cogs that engage or disengage vertically depending on the presence of fluid; torque of the inner shaft is transmitted to the coupler and from the coupler to the movable body, and in turn, to the fixed cog, and then to the outer shaft, when it is in the clutch position. The invention also consists of a group of chambers and peripheral walls that allow the assembly to operate in optimal conditions, avoiding malfunctions, breakdowns and unhealthy conditions by preventing the buildup of fluff, scale, fibers, sediments, dirt or undesired objects hampering the correct operation of the invention and of a home-type washing machine.

8 Claims, 18 Drawing Sheets

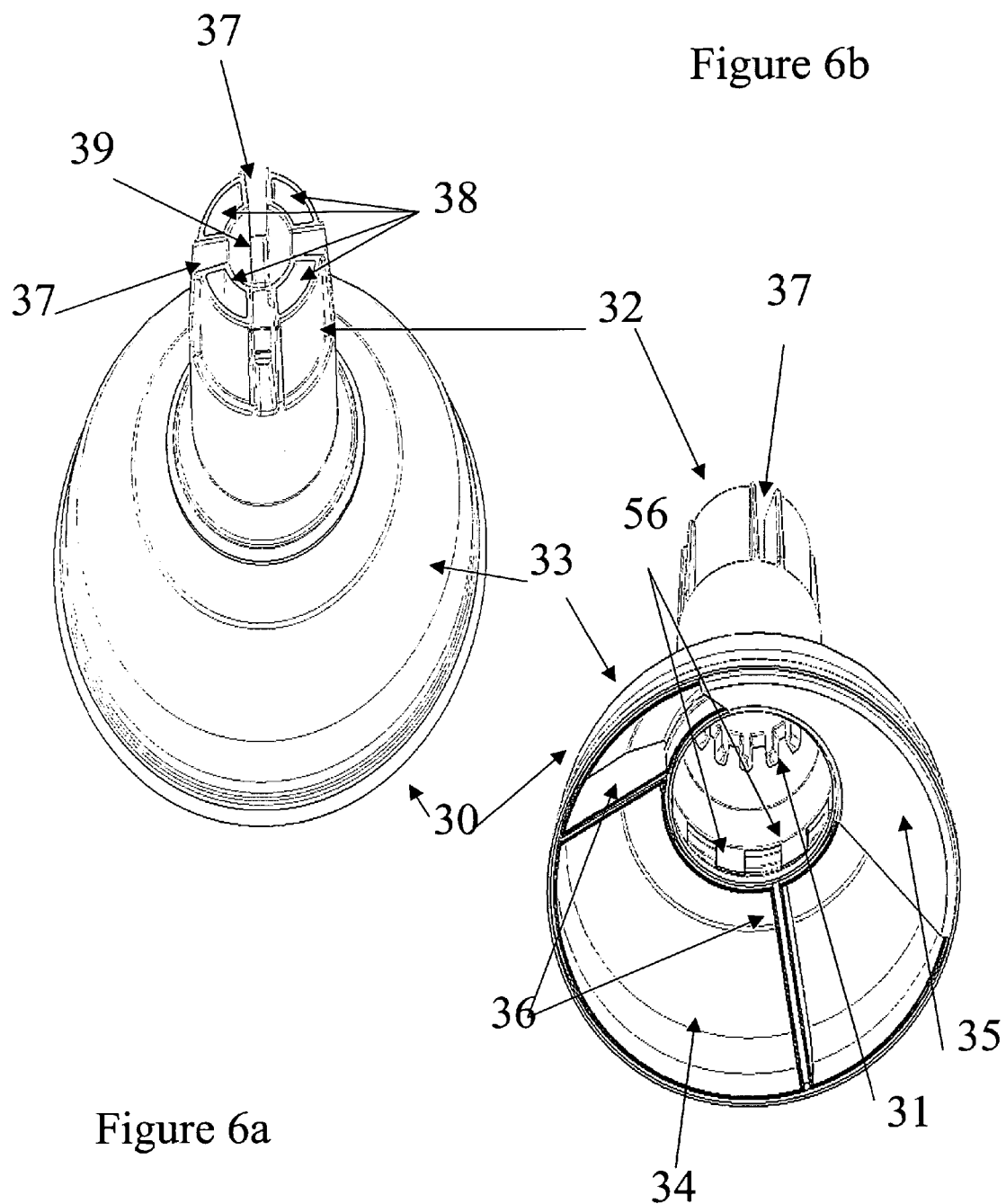

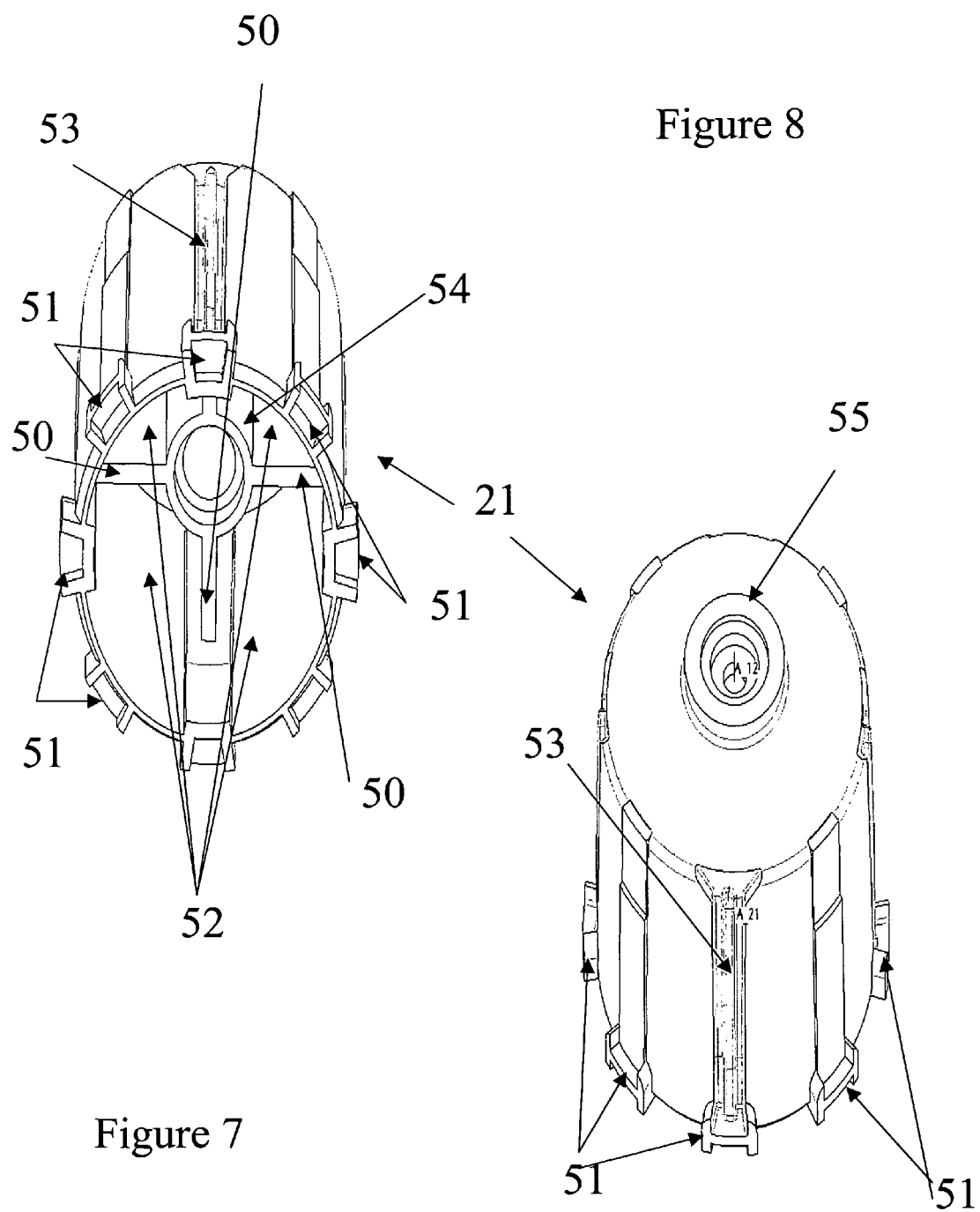

FLOATING CLUTCH FOR DUAL CONCENTRIC SHAFTS ARRANGEMENT

This application claims priority to Mexican application Serial No. PA/a/2005/013677 filed Dec. 14, 2005, which is incorporated herein by reference in its entirety.

BACKGROUND OF THE INVENTION

This invention belongs to the field of mechanics, specifically to the area of clutches and, in particular, to clutches between concentric shafts. The purpose of this invention is to provide an original, simple, reliable, and low-cost clutch design.

There are many different types of clutches. The most common are friction clutches that help to shift the gearbox of an automobile. However, these clutch systems are far too expensive for simple applications, making it necessary to develop alternatives designs to migrate to lower cost solutions with fewer components, that are easy to manufacture and produce, and stands aggressive or uncommon environments. For example, clutches of the type that operate submerged in some type of hydraulic or electromagnetic fluid, and should withstand the attack of chemicals, sediments, dirt, the presence of foreign objects, different fluid densities, particles traveling by the fluid, and even the presence of organisms in the fluid. In these environments, a friction clutch would not work properly or the specific application requires a different torque level.

Thus, this invention can provide a clutch system for concentric shafts that are not required to transmit high levels of torque. Preferably, the shafts would be placed in a vertical position because the action of gravity is desirable for the proper operation of the proposed system. They would be totally or partially submerged in some type of fluid, for example, a small fish tank pump that requires at least two different pumping speeds, depending on the fluid level inside; or industrial agitators where chemicals are blended in huge tanks that require at least two different mixing speeds or that require that the paddles spin at the same or at different speeds, depending on the level of the fluid or the physicochemical characteristics of the process. Other possible applications may be the treatment of wastewater separation of solids, fans, turbines, etc.

Examples of some efforts to achieve the requirements described on the paragraph above are described next. U.S. Pat. No. 3,557,580 to Racenis describes a transmission system of an automatic washing machine with a peculiar clutch. Said patent describes a grooved shaft driven at one end, and having a splined surface on which the central portion of a reel of female splined matching is placed; in one of its faces it has bulges or teeth arranged to engage a shaft, which will drive it; said reel is moved along the axis through a connecting rod. U.S. Pat. No. 2,609,697 to Ruscoe describes a similar device: an internal motor shaft that transmits high speeds in only one direction; an external shaft connected to a transmission that delivers oscillatory motion at low speed; a system consisting of a clutch and a reel with serrated upper and lower faces that moves along the axis over the internal motor shaft. At its highest position, the reel engages the teeth of the upper face to those set under the "T" or "hat" at the end of the internal motor shaft. Said reel has a bell structure that slides from its upper section along the axis over the grooves of the third shaft that is driven. When the reel is at its lowest position, it engages the teeth set over the lower face to those set on the upper face of the cogwheel of the oscillating outer motor shaft, delivering oscillating motion to the third collinear driven shaft.

Top loading automatic washing machines represent a very interesting and natural application for this invention, because these devices use several types of clutches. An agitator or a propeller agitates the water, so that fluid and soap (washing liquor) passes through the fibers of the fabric and to create friction among clothing and remove dirt with the washing liquor. After this, the washing liquor is removed, the clothes are rinsed and centrifuged. For these operations, the cloth-containing basket needs to spin at high velocity, which is not the action done by the agitator because it just oscillates at a lower speed but with a higher torque. Given these characteristics, this invention is ideal for this application; considering and compared to the complex clutch systems or multiple component systems that make them unreliable, expensive, and difficult to manufacture or assemble.

There are several approaches to employ similar systems on top loading automatic washing machines as described by the U.S. Pat. No. 2,665,576 to Thiele, it discloses a clutch system of two fixed gears arranged over a motor shaft, it spins at the same speed as the shaft; and a flotation assembly that includes the agitator and the basket, a feature that is not very desirable in current top loading domestic washing machines, because this configuration tangles the clothes. When the flotation assembly floats due to the presence of the washing liquor, the female cogs set inside the body of the agitator engage the fixed cogs, thus receiving energy from the motor shaft. This system has the inconvenience of not using a pair of concentric shafts, and shows a complicated system of bands and other clutches in order to carry out the different washing operations. This situation is additional to the great space that the flotation chambers require to provide lift and move the entire tub including the clothes and the agitator in the presence of a certain level of water.

Another contribution to the state of the art is Patent GB915997 of Kovosmalt, Narodny Podnik that describes a clutch for a top loading automatic washing machine with a peculiar feature. For the spinning cycle, it is not necessary to remove the water from the liquid reservoir tub (container), instead of that, the basket is raised by means of a spring and blocking systems that secure the basket, both in its raised position and when it lays on the bottom of the reservoir tub. This washing machine has an agitator that spins independently from the washing basket. The clutch system is comprised of a dented hub that engages some handles set over the second outer shaft on which the upper end of the agitator is also set on a square arranged for that purpose. Said dented hub transmits power from the second outer shaft to the washing basket on the spinning cycle; when the basket is raised, the dented hub falls and engages the basket to the second outer shaft. This has the disadvantage of having to raise and lower the basket to engage the clutch, as well as raising the washing basket to be able to spin its contents which, according to the configuration of modern washing machines desirable.

Another text worthy of study is U.S. Pat. No. 5,651,277 to Richardson, which describes a clutch for an automatic washing machine that comprises a floating cone with a dented lower part and some splines arranged in the periphery; said splines engage some ribs arranged for this purpose inside the agitator so that the agitator and the floating cone spin in unison. The lower part of the cone is dented in order to engage with some ribs in a radial arrangement at the bottom of the basket; this way the agitator is set on a motor shaft connected to the electric engine, the shafts pass across the reservoir tub and basket. The basket has a bearing arrangement on the hub with a coaxial arrangement on the motor shaft. In a first scenario, the reservoir tub has a set minimum level of liquid and the floating cone rises separating itself from the bottom of the basket, allowing the agitation or washing action inside the basket. The next scenario is when there is no washing liquid and the floating cone lays on the bottom of the basket due to the action of gravity; the energy from the engine passes through the motor shaft, the agitator, the floating cone and, at the end, it reaches the bottom of the basket, thereby achieving the spinning action. However, this system has a series of drawbacks: The action of the clutch takes place in a wet environment or in contact with water which is associated to the problems described below. To work correctly, the system needs to drain the basket completely; if the basket is not properly drained, the floating cone will not complete its clutch stroke. Another noticeable problem shows on the ribs set at the bottom of the basket, which are ideal places for the buildup of scale, fluff, impurities, and detergent residues, which, in time, could increase the width of the ribs and stop the floating cone from engaging correctly. Besides, thin or small garments such as handkerchiefs, socks, diapers, cloth, etc, can be pulled and get stuck under the agitator aided by the ribs and holes, obstructing the zone where the clutch action takes place, so the floating cone will not be able to engage correctly to the bottom of the basket. This creates an unhealthy condition because, being in a place that cannot be seen, the user is not aware of all the fluff sediments, dirt and the clothes that tend to accumulate in the ribs creating a growing media for bacteria. The user is unable to remove the impurities because he/she can hardly see them or even imagine this is taking place under the agitator or propeller; which creates a paradox because washing machines are supposed to be hygienic devices which purpose is to clean clothes or garments that go through a washing cycle inside said devices; the design of a washing machine should foresee and address these inconveniences and not allow the buildup of foreign objects, fluff, fibers, sediments, scale or dirt in general. Therefore, we can conclude that said ribs are undesirable, because they complicate the design and manufacture of the basket, they are not hygienic, they damage the cloths, and they make the system fail after a while. Additionally, it is evident that the floating cone has serious drawbacks as well; one is the design itself, because by having an open flotation chamber, some lift is lost due to the buildup or adherence of sediments to the air chamber. The lift will be poor because, according to our analysis, it will only have enough lift to rise, but it can be assumed that the turbulence present in the zone during the agitation action will cause the floating cone to descend, engaging the tub for brief periods, due to the decrease of the air volume inside the air chamber; which, while open, allows the exchange of airflow for a liquid flow, this combined with the buildup of scale or sediments in time will increase the weight, which will reduce lift.

Another interesting document is U.S. Pat. No. 6,634,193 to Lee, et al., disclosing a clutch located between a solid motor shaft and an outer hollow propelled shaft. The internal shaft is splined on its exposed part or outside the outer hollow shaft. The latter also has a type of spline on its upper end. The floating assembly travels along the axis on the solid motor shaft (internal), since the floating assembly has two splines; the first one with a narrower diameter is located on the upper part of the floating assembly, big enough to travel along the axis over the solid motor shaft. The second spline is located just in the lower part of the first spline, where it is necessary to increase the diameter to accommodate the outer hollow shaft (propelled); thus, when the floating assembly settles down due to the action gravity, it engages the lower spline of greater diameter to the spline on the end of the outer shaft. Now the internal and external shafts spin in unison. So far the invention seems to work properly, but the problem lays in how to obtain a "dry" clutch, which means that the part or parts that perform the clutch action must not be in contact with the water, to prevent foreign objects from housing in there (as was the case with Richardson). Probably, thinking about this possibility, a hollow shaft or a sheathing protruding from the center of the propeller was procured. This sheathing is formed downwards and covers the central part of the floating assembly, forming some kind of cover that almost seals the bottom of the floating assembly, and because the flotation chambers are located at the level where the clutch engages they surround the rest of the floater. This design prevents foreign objects from housing in the clutch. However it allows the buildup of residues, due to the dirt carried by water, water hardness, high contents of soap and other chemicals, which over time build up between the jacket of the propeller and the floating assembly, thereby preventing a good performance. If we consider for a moment that the user may inadvertently pour an extraordinary volume of soap, saturating the mix of liquid and soap, a phenomenon known in the art as "sudsing", the creation of an extraordinary volume of foam will occur. This foam has certain characteristics, like bubbles of small size, high contents of soap allow the creation of stiffer structures with a higher air concentration. This type of foam tends to form or get inside small spaces and, at best, only leaves traces or sediments, but at worst it can stop objects in motion or even support the weight of a light object. Thus the discussed patent fails to solve this problem by not addressing it properly, because supposing that the user doses the washing liquid with a large amount of soap and creates the foam described above, the foam will get between the jacket or cover protruding from the center and downward the agitator or propeller and the center of the floating assembly. A possible scenario is that it just builds up sediments, but another scenario is that the "sudsing" effect is created, preventing the proper operation of the clutch, thus causing an undesirable failure that is difficult to repair. Another inconvenience of this design is the use of splines, because machining these splines require a high degree of precision, since an uncontrolled variation could cause, in a first hypothetical scenario, a lack of sufficient space between the pieces and a "loose" fitting that is necessary for the system to disengage the clutch without losing any lift, otherwise causing a loss of efficiency and reliability in the operation of the clutch, or a "snuggly" fit (not loose), or in the worst case, a "clenched" fit. This is critical because when the space between the parts is reduced until they interfere with each other, the system may get stuck and fails. Another hypothetical scenario is having an assembly that is "loose" beyond tolerated limits, which means that the clearance between them is too much, so, when the torque is transmitted there would not be enough contact surfaces between the faces of the splines, thereby causing mechanical engagement failure, and may even wear the splines. The use of splines and the little space of the analyzed system can cause friction between its parts, reducing the freedom of motion and reducing lift; also, during the washing cycle there is evaporation of the water and capillarity. In the first situation, the evaporated water transports salts from the washing liquor, which adhere to the surface of the spline of the shaft and the spline of the floating assembly, thickening their surface and reducing the clearance, thereby provoking unwanted contact between the parts, increasing the coefficient of friction, reducing lift or causing the system to stall. In the second situation, the capillarity can cause buildup of sediments in the clutch zone, the base cylinder and the sheathing (the agitator protrusion), thus affecting the operation of the system. Also we must point out that the floating assembly is not designed to have a bottom lid that would allow catching air efficiently, permitting the entrance of fluid into the flotation chamber, thus reducing the volume of air inside the chamber and causing a reduction in lift, combined with the possibility of building up sediments or foreign objects, making the floating assembly heavier in time. Another drawback of this system is located in the seal or O-ring used to connect the propeller to the motor shaft because it could, in time, allow air leakages and the access of water to the clutch zone or dry chamber, thereby affecting sliding of the pieces because the washing liquid can rust the splines, increasing the friction between the floating cone and the shaft. We must point out that when the washing liquid enters the air chamber it carries sediment fibers and other undesirable objects into the compartment, causing the system to get stuck and fail.

Given the inconveniences described above, we provide an original design for concentric shafts, by avoiding the structural and design problems of prior efforts, and producing an economic clutch, easy to manufacture, repair and maintain, reliable and resistant to chemical attack; that is not affected by the buildup of sediments and that doesn't allow access of or housing foreign elements in the clutch zone. With these considerations in mind the invention hereof will be described below.

BRIEF DESCRIPTION OF THE INVENTION

Today, concentric shaft systems are widely used in the industry for many applications, some more complex than others. They are very convenient to provide a mechanism with at least two different speeds or that has two different functions, like the ability to oscillate either shaft separately, or to make one shaft move along the axis on the other one by placing cam followers, the ability to stop a shaft without disturbing the other, or as a telescopic system, etc. Thanks to this great range of applications, it is necessary to provide a clutch system that is simple, low-cost, and easy to repair and manufacture, reliable and able to work in aggressive environments or submerged in some kind of fluid.

We have devised a concentric shaft system consisting of an internal shaft, preferably solid, that is usually the motor shaft, and a tube-shaped hollow shaft that covers the internal shaft. This outer shaft is usually driven. Now, the interesting part here is to engage said shafts so that at any moment they can either move in unison or they can freely spin separately from each other. The inventions mentioned in the background section of this specification have focused in solving this problem. So now, we will describe our preferred way to do it.

The invention consist is placing a cog preferably close to one end of the outer shaft of the concentric shaft system described above (it is not desirable to place the cog precisely at the edge). The design of this cog is peculiar because the width of the teeth and the pitch are not calculated according to the conventional formulae that can be found in a design book. The teeth of this cog are radially exposed, in the shape of a star. The upper and lower sides of the teeth have rounded edges to allow a smoother sliding and coupling. The pitch between them is wide; a 6 or 12-teeth design is preferred to efficiently transmit the torque without affecting the clutch operation. It is desirable to add a "flat" section on the outer shaft to be able to guarantee the transmission of energy from the fixed cog to the outer shaft, although this can be achieved in several ways with some other mechanism, for example a "setscrew" or a similar device. It is obvious that the fixed cog must have a central section of adequate shape and dimensions to be insert it into the surface of the outer shaft, and locked by means of nuts, locks, bolts, welding, adhesives, etc. It is also desirable to insert a fixed cog in the internal shaft, this cog must be placed in the exposed area of the internal shaft, which is the area outside the outer shaft; the height at which this cog is located depends of the mechanism that interacts with it. In fact, both cogs in other embodiments could be movable or adjustable, to allow selection of a given elevation or distance between them. Once the distance is determined, both cogs must be fixed in place. In case a new adjustment is required, the cogs can be unfixed and relocated.

Going back to the internal shaft, once the adequate position for the fixed cog is determined, the movable body is inserted. This movable body, for design simplicity sake, requires that both fixed cogs have equal dimensions, except for their central bores that must be adapted respectively to each shaft. Therefore, the movable body is shaped like a "female" radial cog in the inside, so it can house the fixed cogs of the shafts. A mechanism that moves the movable body at will must be provided. The first option is to fit the movable body with a doughnut-shaped magnet and flood it with an electromagnetic fluid; depending on its position, it will tend to clutch or declutch. Another option is to place the shaft arrangement inside a duct or arrangement where air is circulated at a certain speed. To harness this energy, the movable body could be provided with fins or a structure similar to an umbrella or parachute that deploys restricting the passage of air and providing energy capable of moving the movable body vertically. In the case of a hydraulic fluid, a floater preferably like a flap will be provided (this is explained in the detailed description of the invention), which will be capable of going up or down when the fluid reaches a minimum set level.

BRIEF DESCRIPTION OF THE DRAWINGS

FIGS. 6a and 6b show isometric views of a movable body according to the third embodiment of the invention.

FIG. 7 shows a bottom isometric view of a bell coupler

FIG. 8 shows a top isometric view of a bell coupler

DETAILED DESCRIPTION OF THE INVENTION

Preferred Embodiment of the Invention

Figure 1:
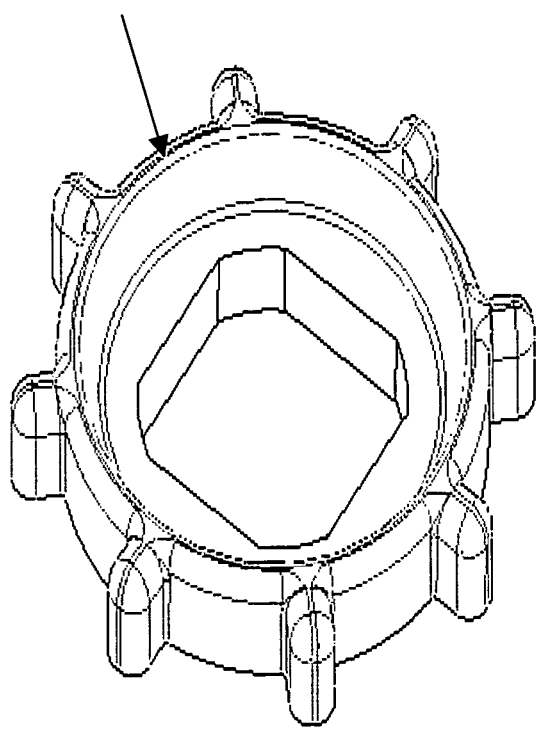
FIG. 1 shows an isometric view of a fixed cog
Figure 13:
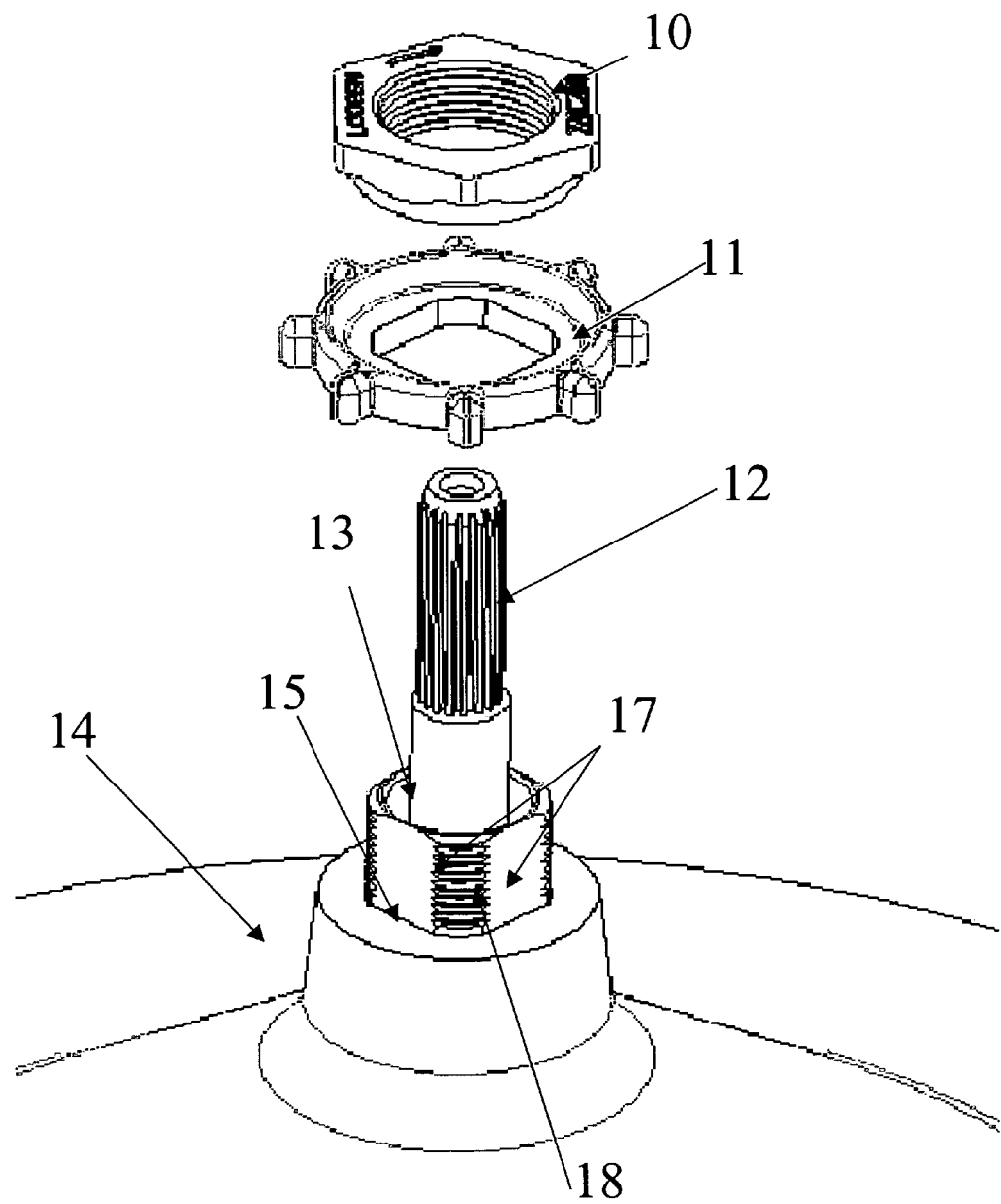
FIG. 13 shows the arrangement of a fixed cog and the outer shaft of an automatic washing machine

FIG. 1 illustrates a design for fixed cog 11, having rounded teeth to allow a better coupling to the movable body. The low number of teeth of this cog is noticeable. It allows for greater tolerances without affecting performance, ensures the transmission of the necessary torque, provides for a low manufacture cost and the possibility of manufacturing with different materials, ranging from soft metals, steel or engineering plastics. Also, its rounded outline prevents the buildup of foreign elements or dirt. This particular fixed cog is designed to be assembled on the outer shaft 13, with an arrangement similar to a bottle top having a square-shaped hole with rounded edges where the outer shaft is introduced as illustrated in FIG. 13. The bottom side of the fixed cog 11 lies on the flat side of the basket center neck 15, which determines the height of the arrangement of the fixed cog 11 to place it inside the dry chamber 63 (to be discussed in detail later on). The whole arrangement is bolted in place by nut 10, which is a left nut. This structure provides a reliable arrangement, easy to manufacture and assemble because it requires a minimal number of parts and has the ability to deliver the adequate distances or required heights for proper operation of the clutch zone that we will discuss in detail later on. If cog 11 needs to be raised a bit, further machining is required on the outer shaft 13, for example, machining a cone or a base. Also, the design of fixed cog 11 would get more complicated because it would require a pair of locks or nuts, or at least a setscrew. In this invention, the proposed "packing" is achieved with a minimum number of parts.

FIGS. 6a and 6b show two isometric views of movable body 32 and flotation chamber or flap 33, which hereinafter will be called the floating assembly 30.

FIG. 6a is a view from the top that shows the upper structure of the movable body 32, where the geometry of the upper cog has been substantially modified. Four of its teeth have a very particular geometry because they have been widened into a trapezoid shape having a semicircular base and upper side, called funnels 38 because they are hollow. This design results from the form of the chambers of the bell coupler 21, to which funnels 38 connect, this will be described later on. On the lower part of the movable body 32 there is a dented periphery, which we call inner, cog 31 that is partially shown in FIG. 6b. Also shown is the bottom part of flap 33 that consists of the flotation chamber 34, which due to the robustness of its design and manufacture has inner reinforcement ribs 36 physically separating the chamber in segments. Preferably, the flotation chamber 34 should be sealed to obtain an optimal operation and maximum lift; this is achieved by the bottom lid 35 which can be attached to the lower end of the flap 33, which form the flotation chamber 34. Several methods can be used to attach bottom lid 35. Some examples will be mentioned, but the scope of the invention will not be limited to them. The first method involves using some type of adhesive or silicone, the second one consists of a snap joint, the third one consists of a welded joint, such as "spin weld", the fourth could be achieved by ultrasound sealing. Then, flap 33 and lid 35 are attached to the movable body 32; this is preferable due to the complexity of producing the movable body 32 with flap 33 as a unit in one piece. Any one of the methods mentioned to attach lid 35 to the lower end of flap 33 may be useful, but in this case, another method is shown. This method is by means of "fingers" or modillion fasteners 56 placed on the upper neck of flap 33 as well as on the lower part of the movable body 32. This way, overlapping the modillion fasteners 56 fastens both pieces. Another possibility is to use an injection technique where the movable body 32 is introduced in a mold where flap 33 is injected. The latter has the task of creating a flotation chamber 34 so that the floating assembly 30 floats in the presence of a set level of liquid. However, if there is not enough water, the flap 33, the flotation chamber 34 and the lid 35 have the task of providing more weight to the floating assembly, obtainable only with the movable body 32, to ensure the proper clutch action and prevent the floating assembly 30 tendency to declutch due to the effect of centrifugal forces. The right weight of the floating assembly must be very carefully determined. It can't be too heavy because it would lose lift, nor too light because the clutch would not engage correctly or it would tend to declutch, and this would make it unreliable.

Figure 9:
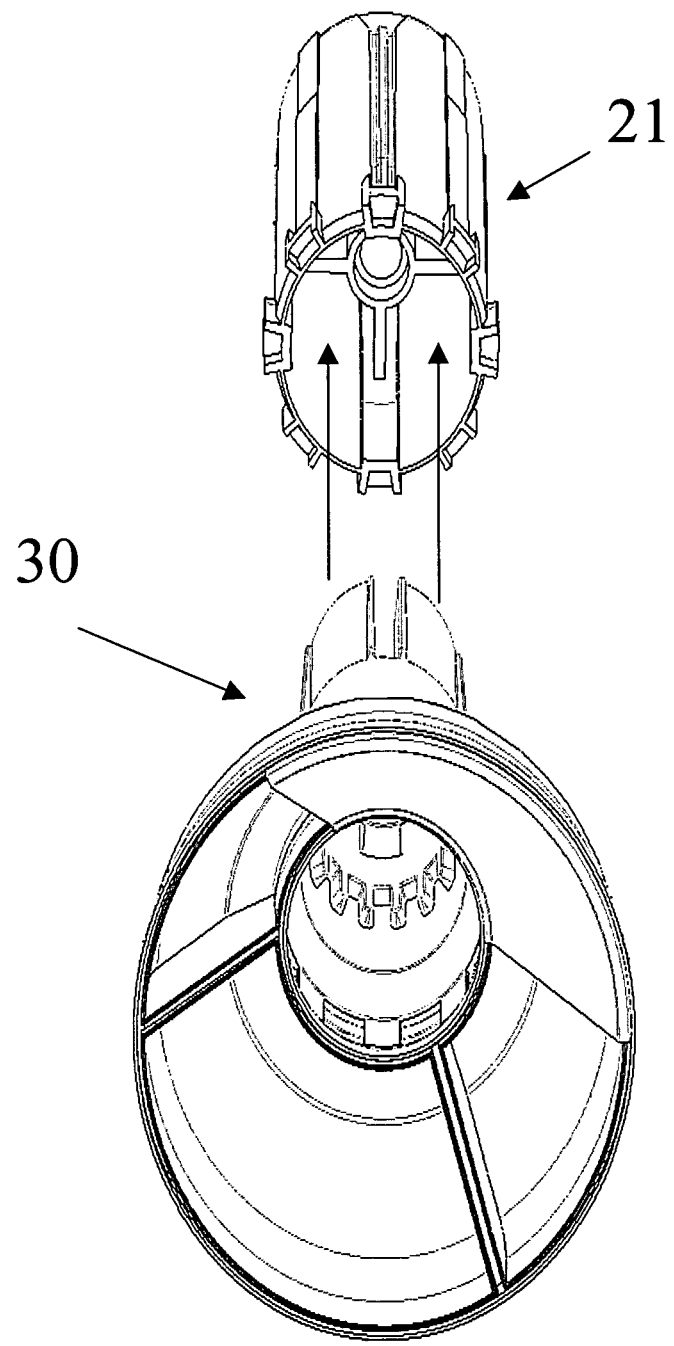
FIG. 9 shows an isometric view with a low reference point, to see the interaction between the movable body and the bell coupler
Figure 16:
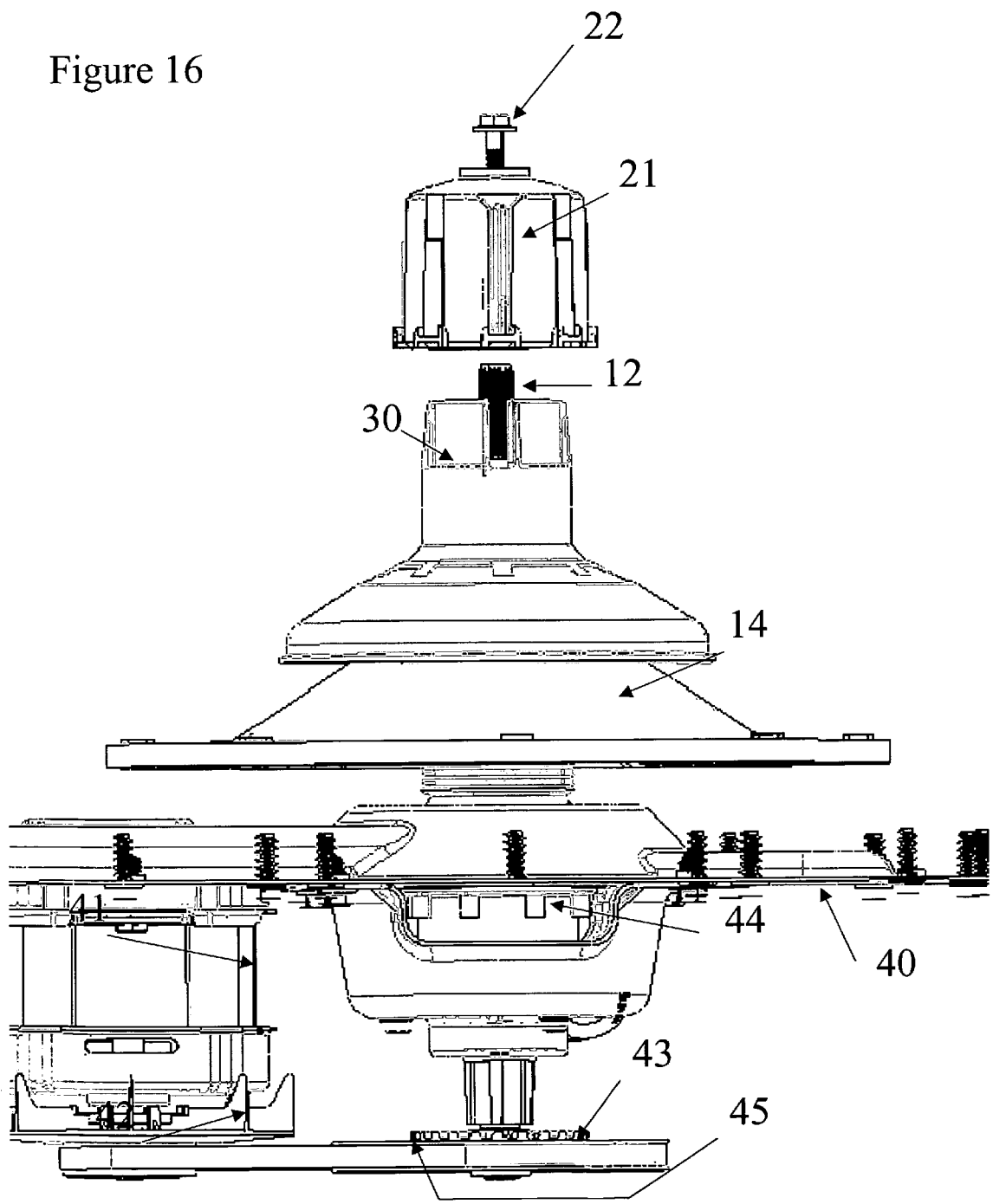
FIG. 16 shows a lateral view of the clutch and transmission in an automatic washing machine

The bell coupler 21 is shown in FIGS. 7 and 8. In FIG. 7 we can observe several components located inside the bell coupler 21, such as the chambers 52 that interact with the funnels 38 of the movable body 32. Note that in FIG. 6a, there is a recession between the funnels; this figure clearly shows four funnels, set at ninety degrees on the upper surface of the movable body 32 as shown in FIG. 9. This recessions, that we call guide slots 37, houses the guide ribs 50 of the bell coupler 21, allowing the chambers 52 to house the funnels 32 with ease to avoid friction between the parts as much as possible and so that the buildup of some sediment, if any, can be tolerated without affecting its operation, allowing the bell coupler 21 and the movable body 32 to spin in unison at any moment. This arrangement not only allows the floating assembly 30 to travel along the axis and delimits the declutch stroke, but it also makes the transmission of torque or energy from the bell coupler to the floating assembly 30 possible because the bell coupler 21 is connected to the inner shaft 12 at its upper end, just where a spline is present. To this effect the bell coupler 21 was fitted with a protruding cylinder starting from the upper vault of the bell coupler 21, called jacket screw 35, which has a female spline in its inner diameter so it can receive the outer spline of the inner shaft 12. We must point out that both parts were designed to have a tight fit between them, and in order to fix the bell coupler in place; the upper side of the inner shaft 12 was drilled and threaded out. The screw 22 is housed in there after fixing the bell coupler 21 in place; this is clearly shown in FIG. 16. The material to manufacture the bell coupler must have the following characteristics: non-hygroscopic material with mechanical properties allowing it to withstand the stresses resulting from cutting and twisting. A plastic material is preferable to facilitate manufacture.

So far we have put together the clutch arrangement but, when running lab tests, we noticed that the design needed reinforcement. Although this design is capable of operating in a submerged condition, into a fluid with detergent, impurities, residues, foreign objects (pieces of cloth, buttons, coins, paper, pens and a wide range of objects that can be found in a domestic washing machine), we determined it was desirable to keep the clutch zone away from the liquid, which eliminates the possibility of the presence of scale, chemical or soapy residues, foreign objects, dirt, impurities or any other material or object that could be transported, floating or mixed in the washing fluid. This way, the reliability of the design would increase greatly. This led us to devise the construction of a dry chamber, keeping the idea of limiting the current number of parts in the system. A task that was not easy to solve, however, at the end of the day, we found an optimal solution that we describe herebelow.

Figure 15:
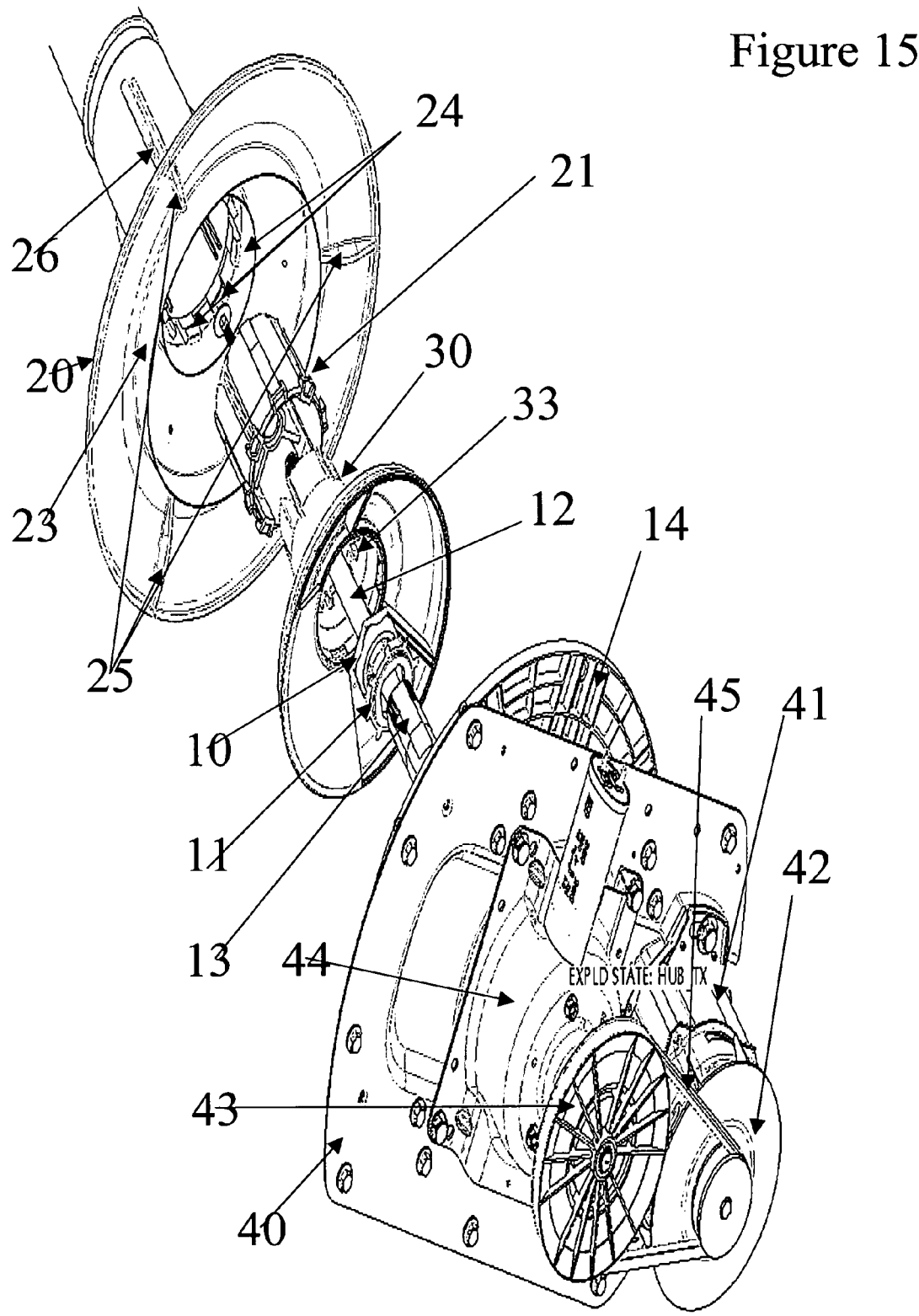
FIG. 15 shows an exploded view from a lower point of view of the arrangement of the invention in an automatic washing machine

The agitator 20 is attached over the bell coupler 21 as illustrated in FIG. 15. The arrangement is achieved by a tight adjustment between the outer diameter of the bell coupler 21 and the hollow interior of the agitator 20. The agitator is fitted just in the lower part of its central cavity by means of some modillion fasteners 24, which flex radially outwards until the bell coupler reaches its operating position. The stroke of this insertion is delimited by the stubs 51 of the bell coupler 21 (see FIGS. 7 and 8). Once the fasteners seat in the periphery of the inner cavity of the agitator 20, the modillion fasteners stop flexing and hold the assembly at the lower part of the periphery of the bell coupler 21, not allowing it to be extended removed.

Figure 2:
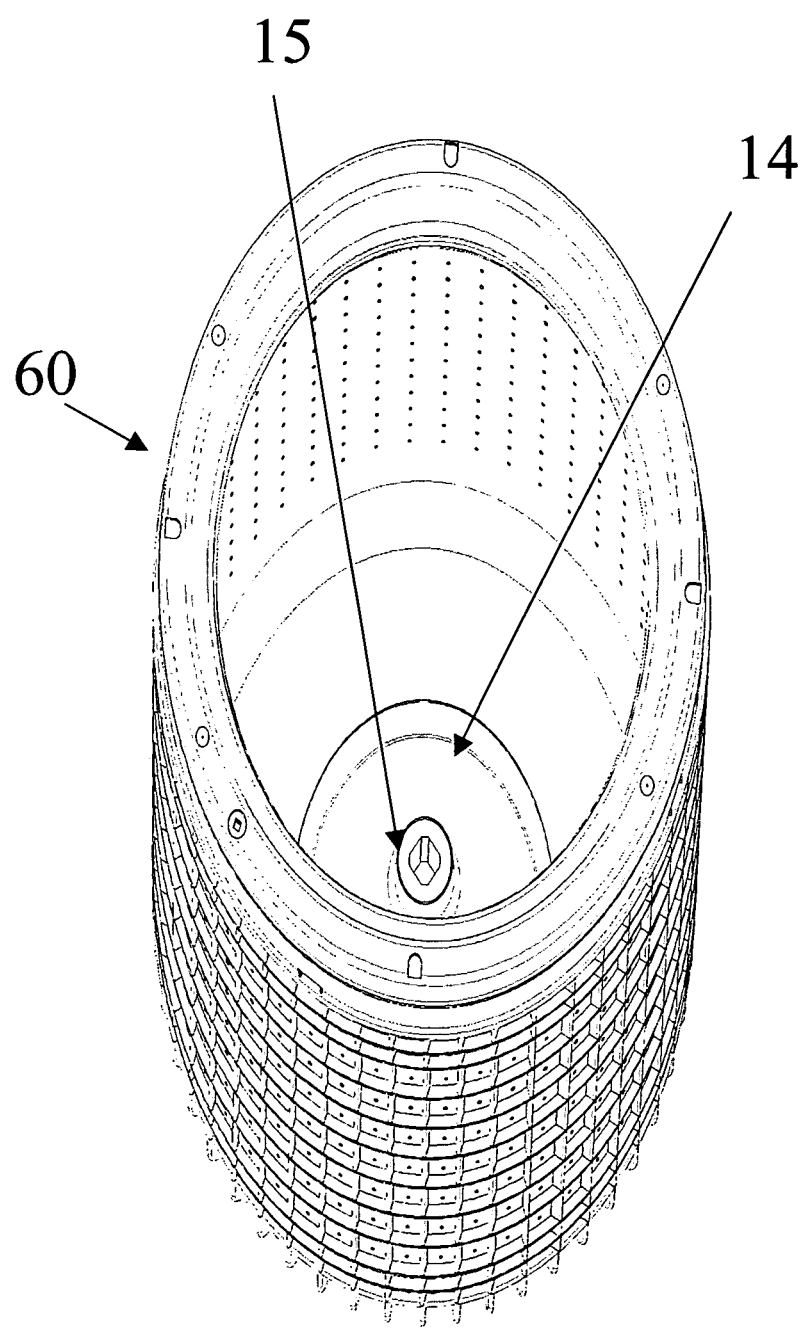
FIG. 2 shows an isometric view of the washing basket.
Figure 3:
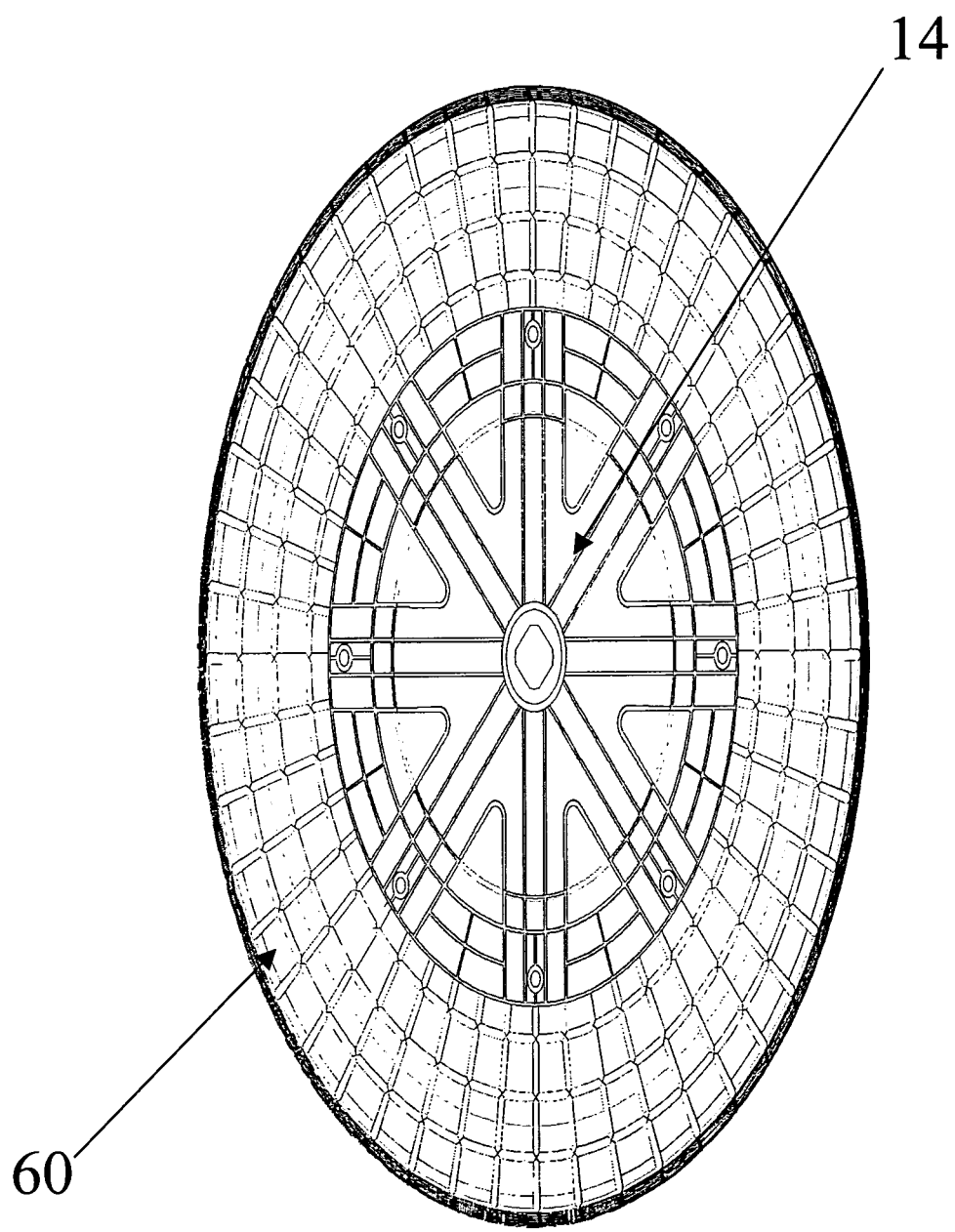
FIG. 3 shows a bottom view of the washing basket and the basket center
Figure 4:
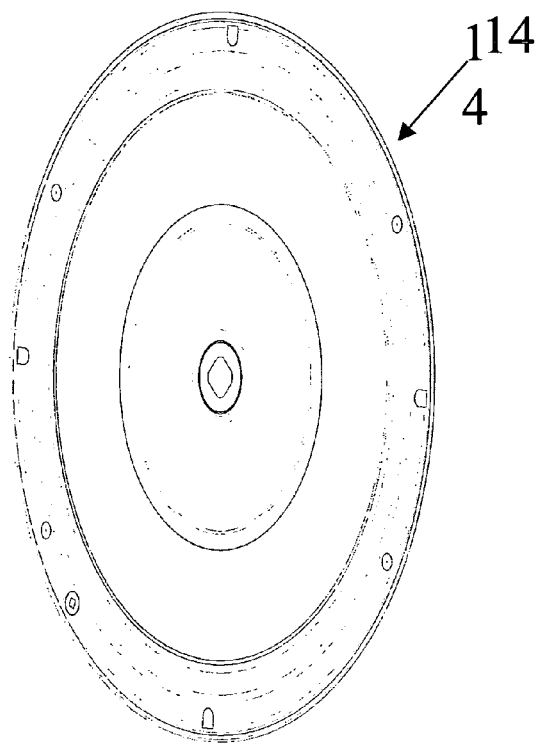
FIG. 4 shows a top view of the basket center
Figure 5:
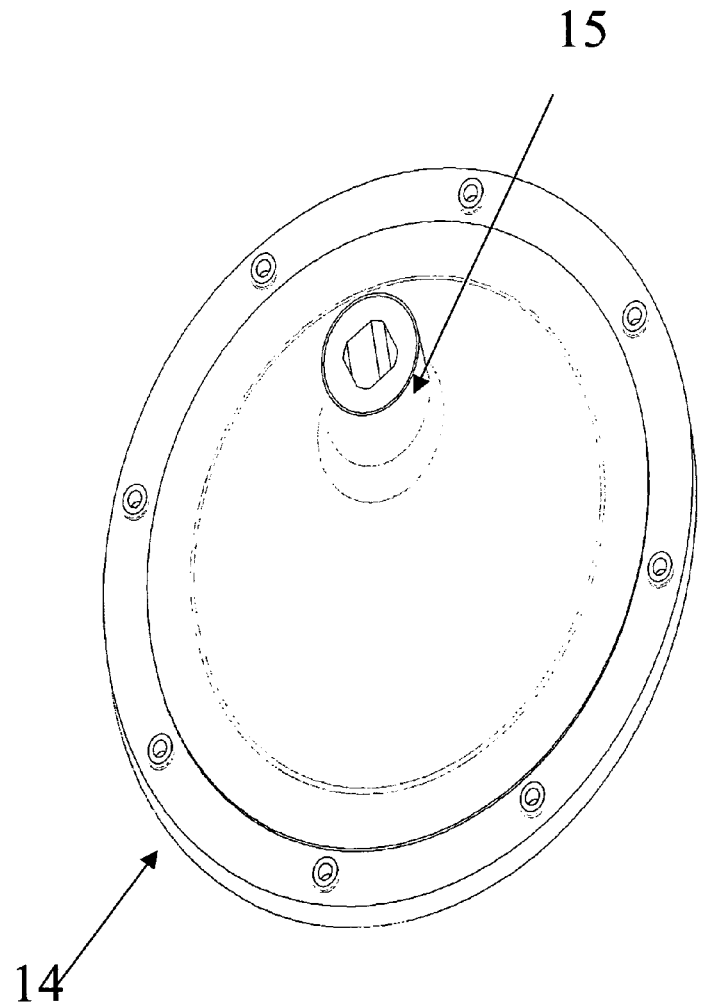
FIG. 5 shows an isometric view of the basket center
Figure 10:
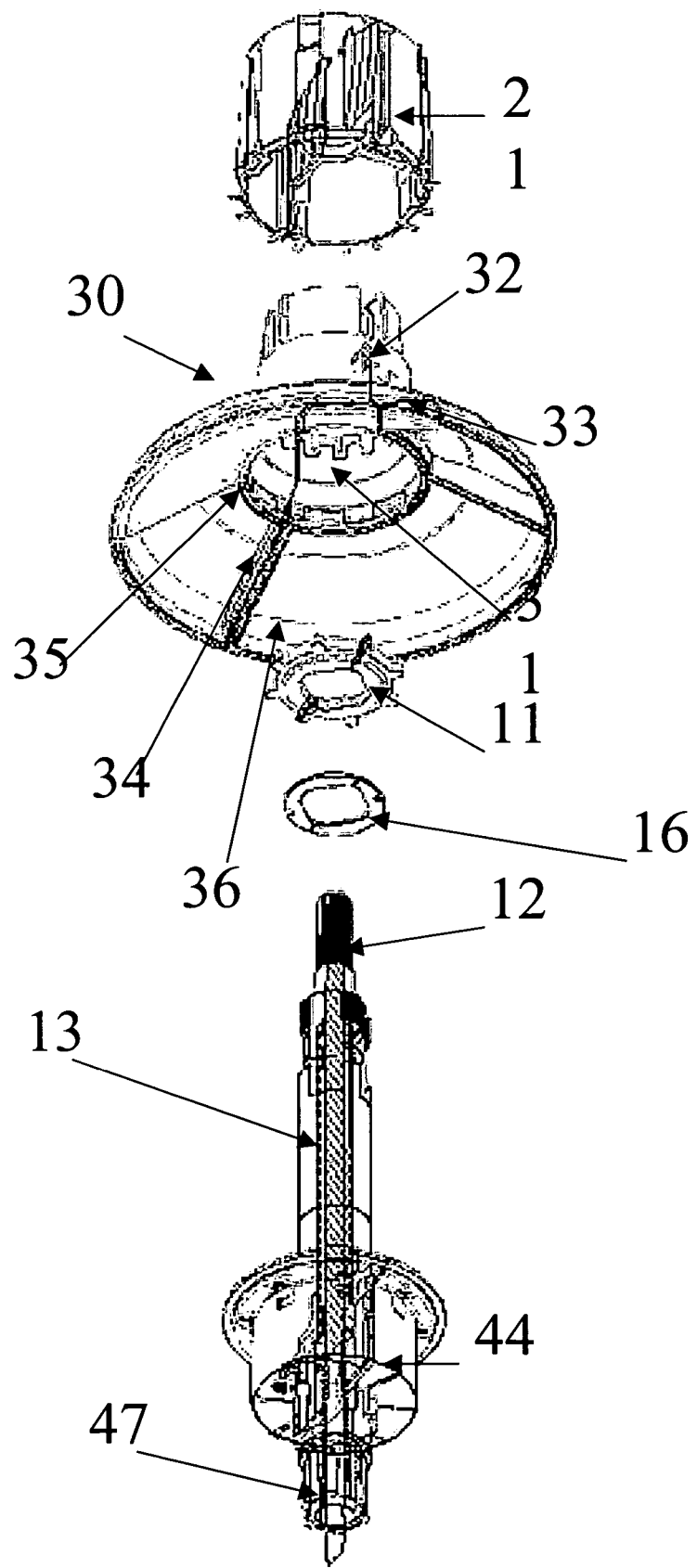
FIG. 10 shows an exploded view of the third embodiment of the invention.
Figure 11:
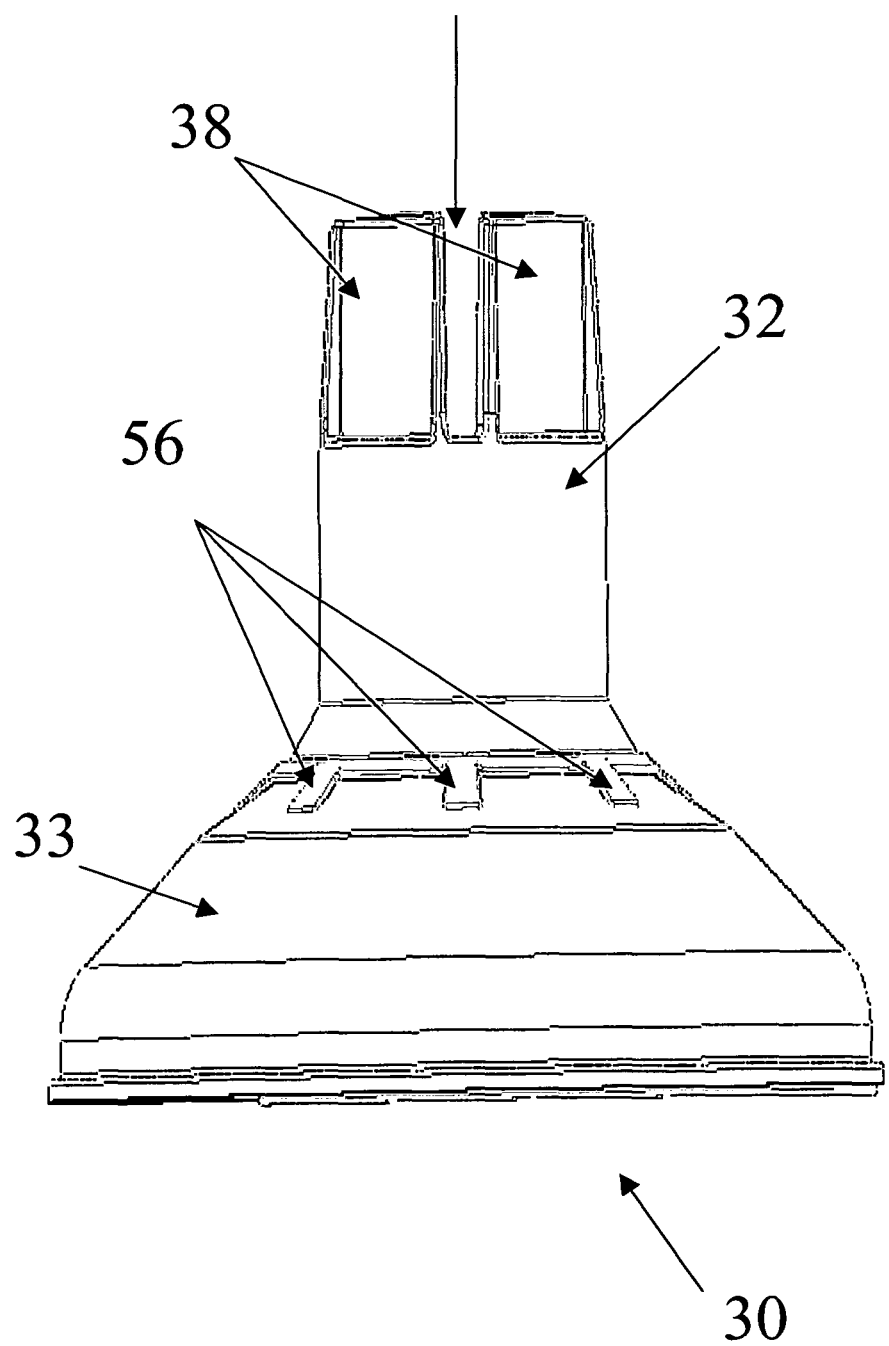
FIG. 11 shows a lateral view of the movable body of the third embodiment of the invention
Figure 12:
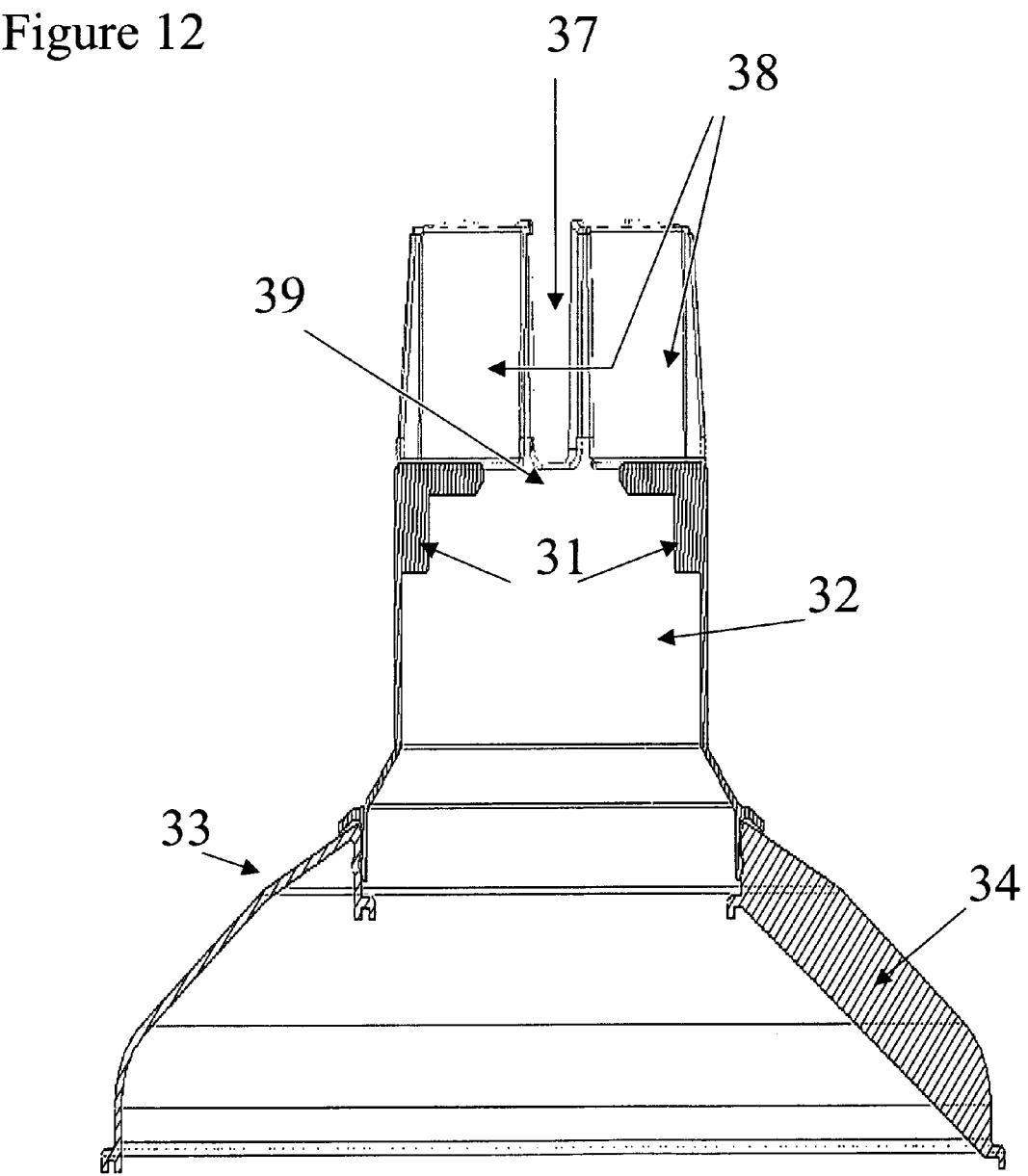
FIG. 12 shows a cross section view of the movable body where the flotation chamber is shown
Figure 14:
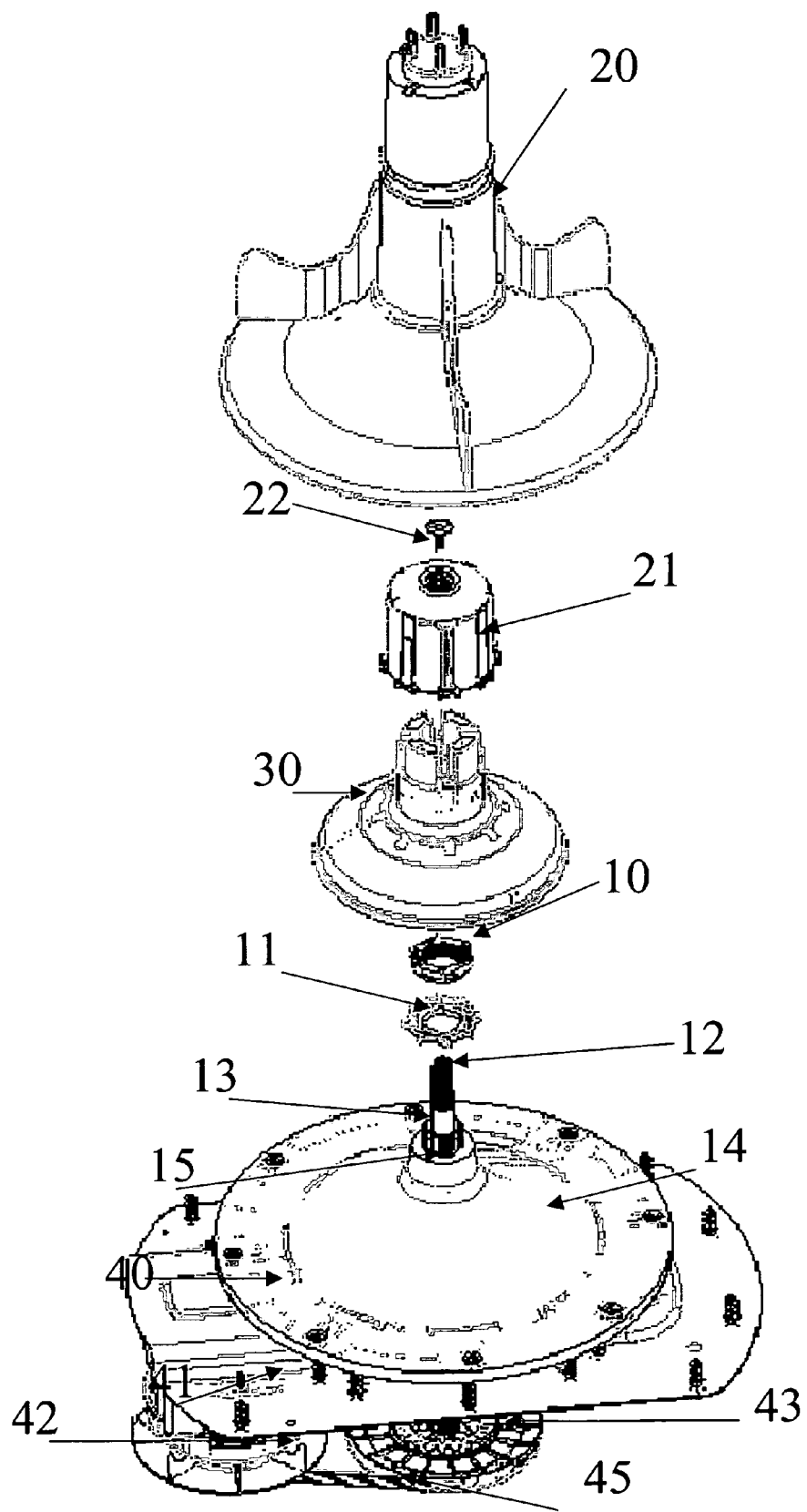
FIG. 14 shows an exploded view of the arrangement of the invention in an automatic washing machine

The basket center 14 that is subsequently attached to the washing basket 60 as illustrated in FIGS. 2 and 3, and is previously placed over and through the outer shaft 13. Immediately after that, the fixed cog 11 is placed through and tightened by a left nut 30, so it gets packed as shown in FIG. 13, as well as in FIGS. 10, 14 and 15. We need to point out that the design used for the basket center 14 is smooth and even, not having bulges, ribs or any type of accessory or recession in its bottom, since that is what causes buildup of sediments or jamming of objects, apart from causing damage to the clothes or hampering the proper operation of the clutch system. Therefore, we took the decision to design it as smooth as possible as shown in FIGS. 4 and 5. Particularly in FIG. 5, the neck 15 is shown as having an angled section that helps in the correct demoulding of the piece during manufacture, but it also serves to prevent the buildup of fluff, sediments, fibers, etc. that could adhere to it. In FIGS. 2 and 3 it is emphasized that the center of basket 14 and the basket 60 have smooth finish.

Figure 17:
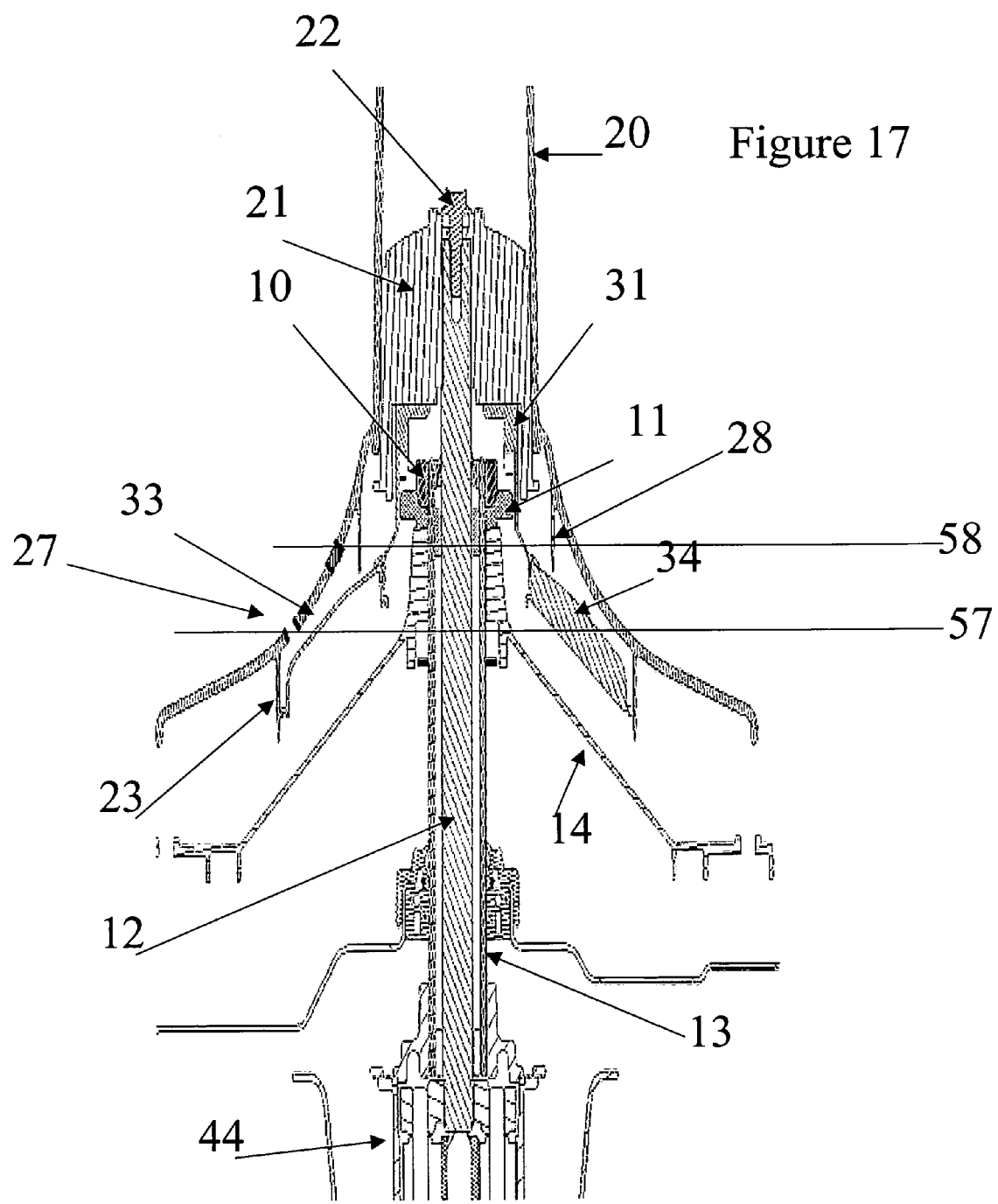
FIG. 17 shows a cross section view of the whole arrangement in a washing machine illustrating a raised position of the movable clutch
Figure 18:
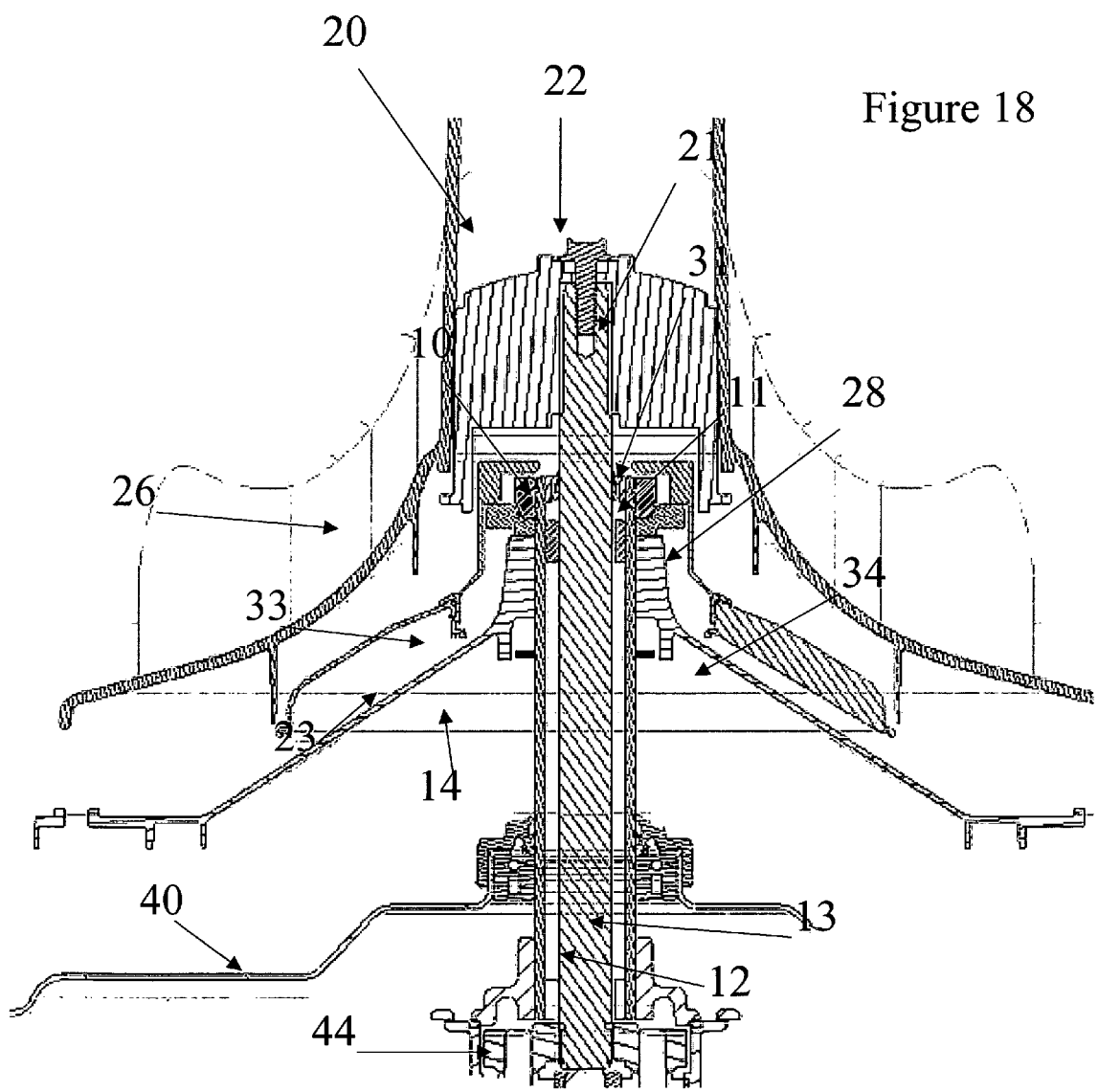
FIG. 18 shows a cross section view of the whole arrangement in a washing machine illustrating a lowered or rest position of the movable clutch

Now, we refer to FIG. 17, which shows a cross section view of the concentric shafts arrangement 12, 13 and clutch. Notice that the agitator 20 is placed on the bell coupler; and the whole clutch system is housed under it. The inner base of the agitator tends to catch air, because it isn't fitted with a vent (except for a level orifice 27), forming an air chamber, similar to the effect achieved by submerging a glass in a body of water; if said glass is held by its base and its rim is introduced first in a vertical position, it will contain the volume of air caught in the interior of the glass. A similar effect happens here, because as the reservoir tub 61 is filled in with liquid, it floods the basket up to a minimum set level in order to carry out the washing cycle. Just below the agitator, water enters up to the level allowed by the level orifice 27, thus creating two chambers. The first chamber is located under the level determined by the level orifice 27 and is called the lifting chamber 62, and the second chamber is over said level and is called the dry chamber 63. FIG. 17 shows level orifice 27 located in the flap of the agitator 20, at such height necessary to guarantee that when there is a minimum level of water to carry out the washing operation in the reservoir tub 61, the flotation chamber 34 of the floating assembly 30, which is initially static before the agitation action starts, is partially submerged in liquid, guaranteeing enough lift to properly declutch the inner cog 31 and the fixed cog 11. The stroke of the flotation assembly is defined by the bell coupler 21. With the flotation chamber 34 partially submerged in liquid there is enough lift to guarantee proper declutching of shafts 12 and 13 and that the floating assembly 30 reaches its highest position. The dry chamber 62 houses the site where the clutch action takes place, where the presence of washing liquid is not desirable because, as already remarked, it carries fluff, loose fibers, sediments, buttons, etc. As shown in FIG. 17, the fixed cog 11 is placed over the level determined by the level orifice 27; the height of the fixed cog 11 determines the position where it clutches inner cog 31. This site is protected by the body of the air chamber 34 of the floating assembly 30 fitted in its lower part with a bottom lid 35, leaving only a small space around the upper part of the basket center 14, allowing water to get into the system, but with the level orifice 27 acting as a limiting factor that doesn't allow it to reach any higher. In a static state before the agitation or washing operation starts, this level is called static level 57 as shown in FIGS. 17 and 18. Regarding the exterior of floating assembly 30, the flap 33 and the exterior of the movable body 32 protect the site of the clutch action, because the internal body of agitator 20 is sealed and only allows the air to exit through the level orifices 27. Therefore, when the water reaches this level 57 it cannot displace the air caught there, ensuring that the clutch zone is not submerged in the washing liquid.

So far, this description applies to the invention in a static state, but it's quite interesting to analyze the whole group in motion. For this analysis we will refer to FIG. 16. In order for the agitator 20 to transmit energy to the washing liquor, engine 41 needs to transmit energy to the motor pulley 42, which activates a "V" band 45 that transmits energy to the driven pulley 43, which in turn moves a shaft that transmits energy to a planetary gearbox 44, delivering power to the shaft 12 which is connected at its end to the bell coupler 21 housed in the inner cavity of the agitator 20. When the whole assembly is in motion, the agitator describes an oscillatory motion because the electronic control regulates the time that the engine 41 turns on to one side or the other, in this way the agitator 20 is able to transmit energy to the washing liquid.

Now, assuming the reservoir tub 61 has at least the required minimum level of water to start the washing cycle; under the agitator 20 the air chambers 63 and the lifting chamber 62 are well formed and defined, while the floating assembly 30 is in its highest position, when the agitation operation begins (when the agitator 20 oscillates over its axis and transmits energy to the water) it causes turbulence in the washing fluid. This energy makes the particles of liquid to move from one side to the other (water currents), increasing their speed and, as it accelerates, it generates a change in the liquid pressure (if its initial static state was taken as reference). This phenomenon also helps to displace the air caught in the dry chamber 62 by liquid, thus modifying the boundary between the lifting chamber 62 and the dry chamber 63. We will call this, the new dynamic level 58 and as shown in FIGS. 17 and 18, this new level floods the flap 33 of the floating assembly 30, giving it maximum lift, and securing its farthest position from the fixed cog 11. This new dynamic level 58 is determined by the internal geometry of the agitator 20 through the chamber ring 28 and the upper surface of the flap 33 of the floating assembly, creating a barrier that prevents the mass of air from being replaced by water. What really concerns us at the agitation period inside the reservoir tub 61 is what takes place under the agitator 20, because it's easy to imagine that the turbulence generated by the fins 26 of the agitator 20 also generates currents under it. FIG. 17 shows where the boundary between the lifting and dry chambers (62 and 63) is defined. In the presence of turbulence and water currents it's impossible for said boundary to remain as a static line, rather it is either a wave that resembling a sine curve, with a variable frequency and magnitude, or it could take any random form since there is nothing to regulate it. This causes the floating assembly 30 to oscillate vertically and "sway" over shaft 12 following the rhythm of the waves, currents and turbulence of water generated in the lifting chamber 62. If the turbulence or the waves generated by the currents are intense or of great amplitude, the floating assembly 30 would tend to lower its level enough to cause an unwanted, momentary clutch action between the fixed cog 11 and the inner cog 31, which would, at best, only produce noise caused by the crash between the teeth of the inner cog 31 and the fixed cog 11, or it could make the washing basket 60 spin for a few moments. However, if we consider that the washing basket contains a considerable volume of washing liquid and clothes or objects to be washed, we must assume that the inertia is high and difficult to overcome, which makes us consider the possibility that some of the mechanisms involved could break, get stuck or do an unwanted operation. In order to prevent this inconvenience, the agitator 20 was fitted with a pair of concentric peripheral walls 23 and 28. The peripheral wall of smaller diameter and located below and in the highest part of the flap of the agitator 20 is called vaulted peripheral wall 28, shown in FIGS. 17 and 18. Said vaulted peripheral wall 28 protrudes from the lower part of the agitator 20 just where the cone or flap thereof begins. The zone of agitator 20 from which the vaulted peripheral wall 28 protrudes is part of the structure that forms the dry chamber 62. The vaulted peripheral wall 28 extends up to the lifting chamber 63 and a section of its lower end penetrates into it. The purpose of this vaulted peripheral wall 28 is to catch objects, fibers or fluff in the zone comprised between its outer wall and the inner wall of the flap of the agitator 20, and it also serves as a barrier to disrupt the waves generated by the current and to reduce the turbulence in the upper part of the lifting chamber 62 by dragging the liquid in contact with its walls in a semicircular trajectory in the spinning direction of the agitator 20, for every given instant of time during the agitation action, thus modifying the frequency and amplitude of the waves generated by the water currents or the turbulence, so reducing the "sway" and vertical oscillation on the shaft 12, resulting in a vertical motion in relation to shaft 12 of the floating assembly 30 within a set range, thus guaranteeing declutching of the system at any moment during the agitation motion and procuring at least the minimum volume of washing liquid required to carry out the agitation operation. It is conceivable that the lift inside the flotation chamber 34 of the floating assembly 30 is very similar to the lift obtained when the system is static at any moment during the agitation motion, due to the creation of waves with a considerable frequency but with little amplitude in the boundary between the lifting chamber 62 and the air chamber 63.

The second peripheral wall has a greater diameter and is located in the lower inner part of the flap of agitator 20. It is called chamber peripheral wall 23 and it appears in FIGS. 17 and 18. It always works submerged in liquid because it is located inside the structure that constitutes the lifting chamber 62. The purpose of this chamber peripheral wall 23 is the same as the vaulted peripheral wall 28: to trap small objects, fluff, fibers, etc. The trap is made up of the outer wall of the chamber peripheral wall 23 and the interior lower part of the flap of the agitator 20. Another function of the chamber peripheral wall 23 along with the flap 33 and the bottom lid 35 of the floating assembly 30 is to serve as a filter for small objects, by forming a gap through which said objects cannot pass through. It also contributes to disrupt water currents and turbulence coming from the exterior of the agitator 20, thereby helping to stabilize the position of the floating assembly 30.

For the spinning cycle, lets now assume that the liquid in the reservoir tub 61 has been drained. This can be achieved by connecting one end of a draining hose to the lower part of the reservoir tub 61 and leaving the other end at ground level, namely, below the base of the reservoir drum 61. The water will tend to exit by the effect of gravity. If the washing machine cannot be fitted with such a simple design, a water pump can be used. The pump is activated when it receives energy or a signal from the control panel of the washing machine. Draining the washing liquid from the reservoir tub 61 causes the floating assembly 30 to lower as the washing liquor is drained. The floating assembly 30 will then reach its lowest position causing the inner cog 31 to engage to the fixed cog 11. The inner shaft 11 transmits energy to the bell coupler 21, this in turn, transmits it to the inner cog 31 through the funnels 38 and guide ribs 50. The inner cog 31 transmits energy to the fixed cog 11 when they are engaged and the fixed cog 11 transmits energy to the outer shaft 13. The outer shaft 13 transmits energy to the basket center 14 because both pieces are attached together. The basket center 14 supports the washing basket 60 (see FIGS. 2 and 3) and transmits energy to it; thereby causing the spinning action that dries up the contents of the washing basket.

To successfully engage the fixed cog 11 to the inner cog 31, the geometry of their teeth is essential. They shouldn't allow the buildup of sediments or fibers and they should allow the proper clutch action. As shown in FIG. 1, the each teeth of the fixed cog 11 have, at the upper face, an arc of a radius of at least half the thickness of the tooth. This tooth design is the same for the teeth of the inner cog 31. During the clutch operation, the moment the inner cog 31 gets in contact with the fixed cog 11, it will be able to slide because it will find an arched surface and not a flat surface. This allows both cogs 11 and 31 to have a single point or line of contact, which must be tangential during the clutch operation, allowing one cog to slide over the other. Otherwise, if the surface is left flat, the cogs will tend to create areas of interference, preventing or hampering a successful clutch action; contrary to the tangential lines or points that allow the movement and facilitate the operation. We must address the issue of how much the floating assembly 30 must weigh in order to facilitate and secure the clutch action. If it is too light, even if the upper and lower sides of the teeth of the inner 31 and fixed 11 cogs are rounded, it will not slide easily and due to the forces to which it is subjected during the spin-dry cycle it will tend to declutch. On the other hand, if it is too heavy, its lift will be compromised and it will not be guaranteed to be higher than the fixed cog 11.

Second Embodiment of the Invention

Figure 19:
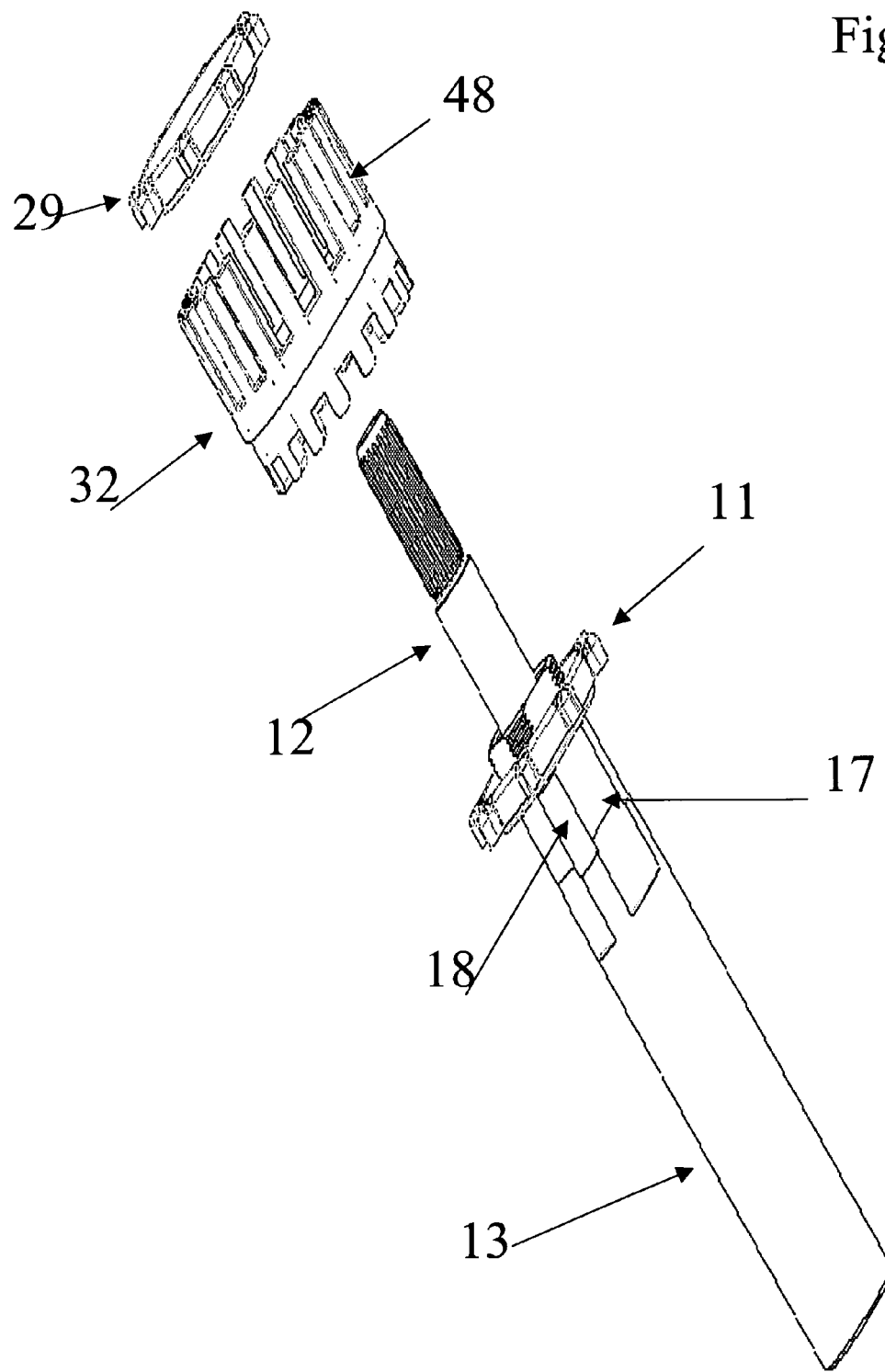
FIG. 19 shows an exploded view of the second embodiment of the invention.
Figure 20:
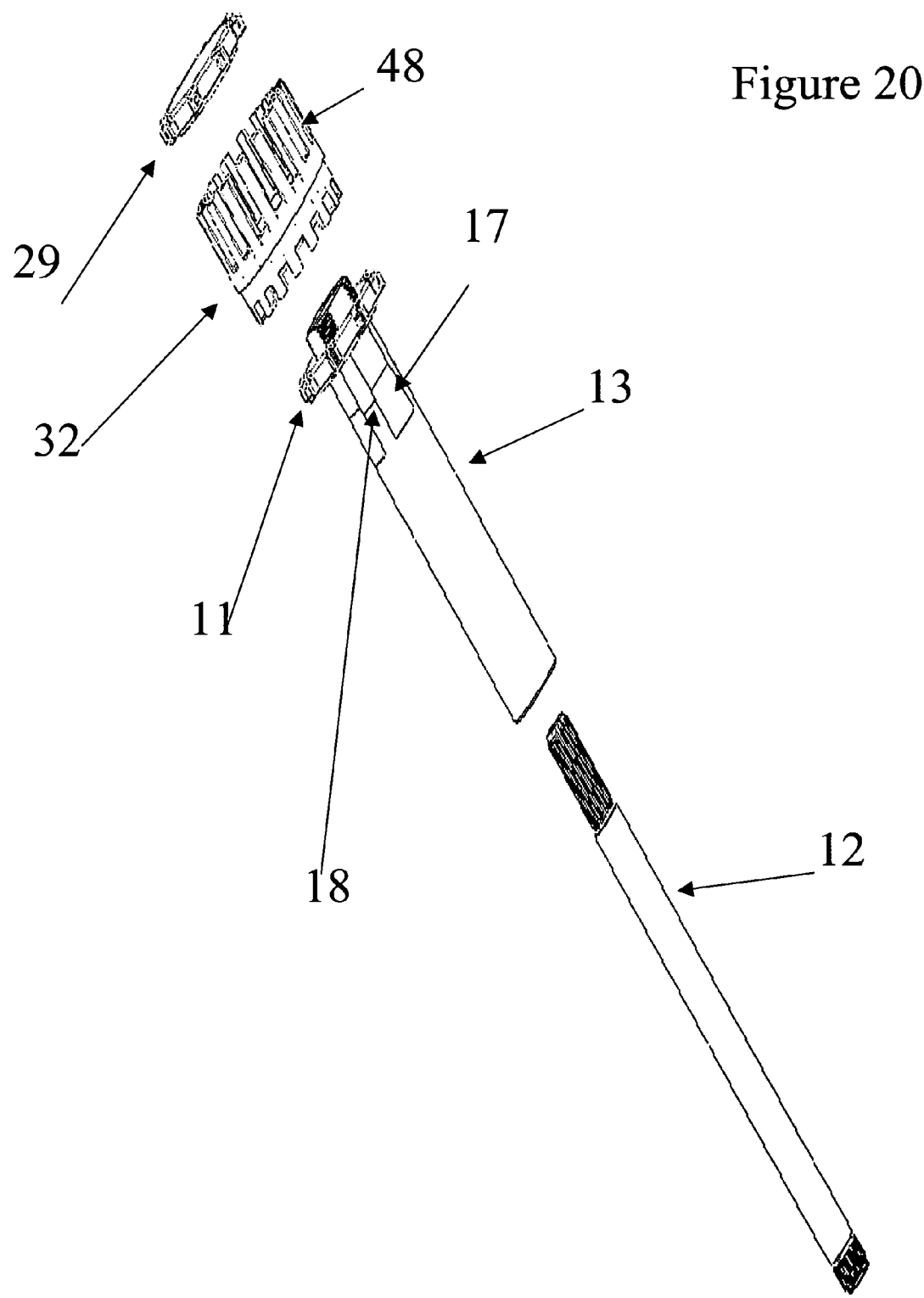
FIG. 20 shows an exploded view of the second embodiment of the invention.

This is a variation of the first embodiment described with ample detail above. FIGS. 19 and 20 illustrate this variation that employs two fixed cogs. That is to, fit both shafts 12 and 13 with a fixed cog. Now, we have a first fixed cog 29 and a "second" fixed cog 11. The movable body 32 is fitted with a female cog 48, its teeth run over the entire length of the inner cylinder of the movable body 32. Preferably both fixed cogs 11 and 29 are equal, except for their central hole because the inner shaft has a smaller diameter than the outer shaft. However this does not preclude having a design where said cogs have different measures or even different types and number of teeth. In this case the movable body 32 must be fitted with a female cog 48 and an inner cog 31. The first fixed cog 29 guides the female cog 48 at all times so that the movable body 32 spins in unison with the inner shaft 12; it allows the movable body 32 to move along the axis of the inner shaft 12, and to approach and engage the fixed cog 11. Also, in this embodiment, the fixed cog 11 is able to move the movable body 32, that is, the movable body 32 slides over the fixed cog 11 to engage the first fixed cog 29.

In order to use this embodiment in an automatic washing machine, the shaft 11 is connected directly to the agitator 20. This is achieved thanks to spline on the top of shaft 11 and a female spline on the upper and lower parts of the agitator 20 accompanied by a fixing screw 22. In this case, the screw must be fitted with an O-ring or some type of bonding agent (for example: silicone) to guarantee air tightness, because if there are any air leaks from the interior of the agitator, the dry chamber 63 will not operate properly. Notice that this variation doesn't require a bell coupler 21 because the fixed cog 29 performs said function. The rest of the assembly is similar to the first embodiment of the invention as described above. In order to abbreviate, said description should be considered as reproduced herein.

Third Embodiment of the Invention

The third embodiment of the invention is a peculiar system, which can operate in any of the two variants described above: Either with the bell coupler 21 attached to the shaft 12 or with the first fixed cog 29 attached to the shaft 12. This variant can be easily adapted to the movable body 32 regardless of its internal configuration, by fitting a magnet 49. Preferably the installation of the magnet is permanent in order to facilitate the construction of the device. The upper end of the movable body 32 is fitted with a thoroidal or doughnut-shaped magnet 49 having an inner diameter greater than the diameter of the rim 39 of the movable body 32, thereby avoiding creating interference between the magnet 49 and the outer shaft 13, and having an outer diameter smaller than the outer diameter of the movable body 32, thereby avoiding interfering with the interaction of the movable body in the agitator 20 or in the device where it is installed or in the bell coupler 21. In the latter case, the magnet 49 must be sectioned in such a way that it can be inserted into the funnels 38 without hampering their operation in any way. If the magnet is inserted into the lower part of the movable body 32, the smaller diameter of magnet 49 must be greater than the bigger diameter of the inner cog 31; the inner diameter of magnet 49 is limited by the cavity that houses the movable body 32. Yet another variation to this design is to attach the magnet 32 in some position between said ends. The restrictions for the magnet 49 would be its inner diameter, which should be sized so as to not interfere with the operations of the movable body 32. It can even be attached to the outer diameter of the movable body 32 or inside it, taking into account the inner diameter requirements so that the movable body operates correctly.

Another variation of this embodiment contemplates the option of manufacturing the whole movable body of a material that can be combined with some type of steel, which after a thermal, physical or chemical treatment can become a permanent magnet; or to manufacture the whole movable body of a ferrous material that can be transformed somehow into a permanent magnet.

Having described the different embodiments of the invention with ample detail, it should be taken into account that all those variables that any artisan with average knowledge on the subject-matter may infer or deduce from the specification described herein shall fall within the scope of this invention. Therefore, we claim as our property all that is stated in the following claims.

The invention claimed is:

1. A clutch arrangement for an automatic washing machine including a cabinet, an engine, two concentric shafts in communication with the engine for producing power output, a fluid reservoir tub, a basket to hold objects to be washed, and an agitator comprising a lower conical flap, the clutch arrangement comprising:
   two concentric drive shafts that pass vertically through a bottom of the fluid reservoir tub, the basket being assembled around an outer shaft of the two concentric shafts at a center of a bottom of the basket, and the agitator being attached to a coupler, the coupler being attached to an inner shaft of the two concentric shafts;
   a fixed cog disposed over an exterior periphery of the outer shaft at a position sufficiently high above the bottom of the tub to limit obstruction of the fixed cog by fluid-borne foreign objects;
   a movable body movable vertically over the two concentric shafts, according to a level of fluid present in the tub to clutch and declutch on the fixed cog, the movable body being vertically disposed inside the coupler as far as the level of the fluid present in the tub allows;
   the movable body comprising guides for engaging inside the coupler for allowing the movable body and the coupler to spin in unison, the guides being a limit to a vertical ascending movement distance of the movable body, the movable body comprising an inner cog for engaging and disengaging the fixed cog, depending on the movable body's vertical position in relation to the two concentric shafts, the movable body comprising at least one flotation chamber;
   an air chamber arranged to provide a dry condition to the inner cog and the fixed cog when the fluid reservoir tub is filled with the fluid, the air chamber defined in part by the coupler and at least a portion of the flap of the agitator above at least one level orifice in the agitator, the at least one level orifice disposed below the fixed cog, and delimited in a lower part of the air chamber by the at least one level orifice in the agitator, wherein inside the air chamber the inner cog of the movable body clutches and declutches on the fixed cog in the dry condition; and
   a lifting chamber formed by at least a portion of a lower part of the lower conical flap of the agitator below the at least one level orifice, and delimited in an upper part of the lifting chamber by the at least one level orifice, wherein in an agitation mode the lifting chamber becomes flooded with the fluid so that the flotation chamber of the floating assembly becomes submerged in the fluid and thereby gains lift;
   wherein a rotational energy of the inner shaft is transmitted to the coupler, then to the movable body and, in turn, to the fixed cog when the movable body is in a clutch position, and wherein relative movement between the inner shaft and the outer shaft is provided when the movable body is not in the clutch position.

2. The clutch arrangement of claim 1, wherein the movable body is further configured for moving vertically depending on the level of fluid in the tub so as to engage the inner cog of the movable body with the fixed cog disposed on the outer shaft when the tub is substantially empty of fluid to enable a spin drying mode of operation and to disengage the inner cog of the movable body from the fixed cog when there is a desired level of washing fluid in the tub to enable an agitation mode of operation.

3. The clutch arrangement of claim 1, wherein the agitator further comprises a first peripheral inner wall circumferentially formed inside the flap of the agitator and outside of the movable body for keeping a desired dynamic level of liquid present between the lifting chamber and the air chamber during an agitation operation, so as to limit intrusion of fluid into the air chamber and in a space between the coupler and the movable body.

4. The clutch arrangement of claim 3, wherein the agitator further comprises a second peripheral wall circumferentially formed inside the flap of the agitator below the first peripheral wall and having a greater diameter than the first peripheral wall for reducing fluid currents generated during the agitation operation and limiting fluid-borne objects from lodging between the movable body and the agitator.

5. The clutch arrangement of claim 1, wherein the agitator further comprises at least one peripheral internal wall that protrude downwards from an inside surface of the flap of the agitator and outside of the movable body to a distance sufficient for protecting the flotation chamber of the floating member when the member is at its highest position, wherein the peripheral wall is disposed within the lifting chamber.

6. An automatic washing machine comprising the clutch arrangement of claim 1.

7. A clutch arrangement for an automatic washing machine including a cabinet, an engine, a fluid reservoir tub, a basket to hold objects to be washed, an agitator comprising a flap, two concentric drive shafts comprising an inner shaft extending from an outer shaft proximate end, both shafts being able to rotate independently from each other, the clutch arrangement comprising:
 a bell coupler disposed at an inner shaft distal end, the bell coupler comprising an annular outer housing and at least one chamber in the bell coupler parallel to the inner shaft and disposed between the annular outer housing and the inner shaft;
 a fixed cog disposed at an outer shaft distal end on the exterior surface of the outer shaft, wherein the outer shaft distal end is disposed between an inner shaft proximate end and the inner shaft distal end, wherein the fixed cog comprises a plurality of radially-extending spaced-apart toothed protrusions disposed at an outer diameter of the fixed cog;
 a movable body between the bell coupler and the fixed cog, the movable body having an axially elongated hollow structure positioned in correspondence with the at least one chamber in the bell coupler, the axially elongated hollow structure configured to movably fit into the at least one chamber in the bell coupler to engage the bell coupler and provide a mechanical connection to rotate together with the bell coupler for transmitting rotational energy to the outer shaft by engaging the movable body to the fixed cog, wherein the movable body includes an inner cog defining a plurality of toothed slots, wherein the moveable body engages the fixed cog by way of the toothed slots of the inner cog receiving the radially-extending toothed protrusions disposed on the fixed cog when the movable body is positioned at a proximate end of a movable body range of motion, wherein the movable body comprises at least one flotation chamber and is responsive to a level of fluid present in the tub to clutch and declutch onto the fixed cog;
 an air chamber arranged to provide a dry condition to the inner cog and the fixed cog when the fluid reservoir tub is filled with the fluid, the air chamber defined in part by the bell coupler and at least a portion of the flap of the agitator above at least one level orifice in the agitator, the at least one level orifice disposed below the fixed cog, and delimited in a lower part of the air chamber by the at least one level orifice in the agitator, wherein inside the air chamber the inner cog of the movable body clutches and declutches on the fixed cog in the dry condition; and
 a lifting chamber formed by at least a portion of a lower part of the flap of the agitator below the at least one level orifice, and delimited in an upper part of the lifting chamber by the at least one level orifice, wherein in an agitation mode the lifting chamber becomes flooded with the fluid so that the flotation chamber of the floating assembly becomes submerged in the fluid and thereby gains lift.

8. A floating clutch arrangement for an automatic washing machine comprising:
 an inner drive shaft;
 an outer drive shaft concentrically disposed around the inner drive shaft;
 a fluid reservoir tub receiving respective end portions of the inner shaft and outer shaft vertically therein,
 a fixed clutch element mounted on the outer drive shaft;
 an agitator disposed in the tub comprising a level controlling orifice through the agitator at a level controlling orifice location below the fixed clutch element;
 a bell coupler disposed in the agitator and connecting the agitator to the inner shaft;
 a movable clutch element axially movable over the inner drive shaft for selectively engaging the fixed clutch element to pass a torque from the inner shaft to the outer shaft;
 a floating element attached to the movable clutch element and responsive to a presence of a fluid in a flotation chamber, the flotation chamber defined in part by at least a portion of an interior surface of the agitator disposed below the level controlling orifice, the level controlling orifice location chosen to keep a level of fluid in the flotation chamber sufficiently below a position of the fixed clutch element to maintain a dry condition around the fixed clutch element and the moveable clutch element independently of a level of fluid in the fluid reservoir tub,
 wherein the fixed clutch element and moveable clutch element are disposed in an air chamber arranged to provide the dry condition to the fixed clutch and the movable clutch when the fluid reservoir tub is filled with the fluid, the air chamber defined in part by the bell coupler and at least a portion of an interior surface of the agitator above the level controlling orifice, and
 a lifting chamber formed by at least a portion of the interior surface of the agitator below the level controlling orifice, and delimited in an upper part of the lifting chamber by the level controlling orifice, wherein in an agitation mode the lifting chamber becomes flooded with the fluid so that the flotation chamber becomes submerged in the fluid and causes the floating element to gain lift.

* * * * *